US011300932B2

(12) United States Patent
Oda

(10) Patent No.: US 11,300,932 B2
(45) Date of Patent: *Apr. 12, 2022

(54) MACHINE CONTROL COMPUTER INTERCOMMUNICATIVELY CONNECTED TO MACHINE, MACHINE SYSTEM, BASE SOFTWARE APPLICATION, COMPUTER-READABLE RECORDING MEDIUM, DATA STRUCTURE, AND MACHINE CONTROL METHOD

(71) Applicant: FANUC CORPORATION, Yamanashi (JP)

(72) Inventor: Masaru Oda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 595 days.

This patent is subject to a terminal disclaimer.

(21) Appl. No.: 15/981,438

(22) Filed: May 16, 2018

(65) Prior Publication Data

US 2018/0341235 A1 Nov. 29, 2018

(30) Foreign Application Priority Data

May 23, 2017 (JP) .............................. JP2017-102137

(51) Int. Cl.
*G05B 15/02* (2006.01)
*G05B 19/418* (2006.01)

(52) U.S. Cl.
CPC ....... *G05B 15/02* (2013.01); *G05B 19/41845* (2013.01); *G05B 2219/31073* (2013.01);
(Continued)

(58) Field of Classification Search
CPC .............. G05B 15/02; G05B 19/41845; G05B 2219/31073; G05B 2219/32085;
(Continued)

(56) References Cited

U.S. PATENT DOCUMENTS 5,402,349 A * 3/1995 Fujita ............... G05B 19/41865
700/100
7,174,474 B1 * 2/2007 Low ...................... H04J 3/0664
327/136

(Continued)

FOREIGN PATENT DOCUMENTS

DE    10230895 A1    3/2003
JP    S63-77685 A    4/1988
(Continued)

*Primary Examiner* — Thomas C Lee
*Assistant Examiner* — Michael Tang
(74) *Attorney, Agent, or Firm* — Hauptman Ham, LLP

(57) ABSTRACT

A base software application and an operation software application are installed in a machine control computer. The base software application includes a first communication unit being a program portion, a second communication unit being a program portion, and an information conversion unit being a program portion. The information conversion unit enables a CPU of the computer to convert first machine information specific to a machine into second machine information specific to the operation software application, based on a data model or the like corresponding to a category of the machine or the like.

49 Claims, 22 Drawing Sheets

(52) U.S. Cl.
 CPC ........... *G05B 2219/32085* (2013.01); *G05B 2219/35499* (2013.01)

(58) Field of Classification Search
 CPC ...... G05B 2219/35499; G05B 19/0423; G05B 2219/25257; Y02P 90/02
 See application file for complete search history.

(56) References Cited

U.S. PATENT DOCUMENTS

| | | | | |
|---|---|---|---|---|
| 7,865,442 | B1* | 1/2011 | Sowell | G06Q 50/184 705/59 |
| 10,009,743 | B2* | 6/2018 | Minear | H04M 15/00 |
| 10,114,623 | B2* | 10/2018 | Oda | G05B 19/0426 |
| 10,317,866 | B2* | 6/2019 | Ogino | G05B 19/0426 |
| 10,423,152 | B2* | 9/2019 | Kanemaru | G05B 19/4183 |
| 10,592,214 | B2* | 3/2020 | Oda | G05B 19/0426 |
| 2004/0255138 | A1* | 12/2004 | Nakae | G06Q 20/045 713/193 |
| 2005/0065880 | A1* | 3/2005 | Amato | G06Q 40/12 705/40 |
| 2009/0276771 | A1* | 11/2009 | Nickolov | H04L 67/1014 717/177 |
| 2011/0270963 | A1* | 11/2011 | Saito | G06F 11/302 709/224 |
| 2012/0041844 | A1* | 2/2012 | Shen | G06Q 30/06 705/26.61 |
| 2012/0131130 | A1* | 5/2012 | Field | H04L 12/4035 709/217 |
| 2013/0103749 | A1* | 4/2013 | Werth | G06F 9/453 709/203 |
| 2013/0212129 | A1* | 8/2013 | Lawson | H04L 67/18 707/779 |
| 2015/0227617 | A1* | 8/2015 | Copass | H04L 67/10 707/756 |
| 2015/0336008 | A1* | 11/2015 | Kohigashi | A63F 13/792 463/25 |
| 2015/0365291 | A1* | 12/2015 | Burton | H04L 47/70 709/226 |
| 2016/0018243 | A1* | 1/2016 | Okon | G01C 19/5776 73/1.77 |
| 2017/0032931 | A1* | 2/2017 | Kamp | H01J 37/32119 |
| 2017/0176968 | A1* | 6/2017 | Ogino | G05B 19/0426 |
| 2017/0248929 | A1* | 8/2017 | Oda | G05B 19/0426 |
| 2017/0329315 | A1* | 11/2017 | Kanemaru | G05B 19/41845 |
| 2018/0217201 | A1* | 8/2018 | Endo | G01R 1/067 |
| 2019/0026086 | A1* | 1/2019 | Oda | G06F 8/76 |
| 2020/0074086 | A1* | 3/2020 | Bulygin | G06F 21/54 |
| 2020/0167136 | A1* | 5/2020 | Oda | G06F 8/40 |

FOREIGN PATENT DOCUMENTS

| | | |
|---|---|---|
| JP | H2-213905 A | 8/1990 |
| JP | H7-56618 A | 3/1995 |
| JP | 07314378 A * | 12/1995 |
| JP | 2004062276 A | 2/2004 |
| JP | 2004-246859 A | 9/2004 |
| JP | 2007-199748 A | 8/2007 |
| JP | WO2007105298 A1 | 9/2007 |
| JP | 2015-156182 A | 8/2015 |
| JP | 2017-62860 A | 3/2017 |

* cited by examiner

MACHINE CONTROL COMPUTER INTERCOMMUNICATIVELY CONNECTED TO MACHINE, MACHINE SYSTEM, BASE SOFTWARE APPLICATION, COMPUTER-READABLE RECORDING MEDIUM, DATA STRUCTURE, AND MACHINE CONTROL METHOD

RELATED APPLICATIONS

The present application claims priority to Japanese Application Number 2017-102137 filed May 23, 2017, the disclosure of which is hereby incorporated by reference herein in its entirety.

BACKGROUND OF THE INVENTION

1. Field of the Invention

The present invention relates to a machine control computer intercommunicatively connected to a machine, a machine system, a base software application, a computer-readable recording medium, a data structure, and a machine control method.

2. Description of Related Art

Conventionally, production planning systems make production plans about products to be produced, the number of the products, delivery dates, machines to be used, production processes, and the like. Based on the production plans made by the production planning systems, operators operate machine tools, industrial robots, and the like in production sites. The operators of the production sites transmit machine operation information, actual production data, and the like to the production planning systems to perform quality control, process control, and the like.

For example, there is a method in which process information is made from a product item object and an operation object, and assignment information is made from the process information and a resource object (for example, refer to WO/2007/105298).

There is also a method in which device information on a machine tool or a measurement instrument is periodically collected at established intervals. The collected device information is stored in a database in association with collection times, and sent to an external device (for example, refer to Japanese Unexamined Patent Publication (Kokai) No. 2004-62276).

In recent years, the diversification of market needs, short product life cycles, and intensified competition in global markets cause an increase in the variety of products and an increase in sales fluctuations. Accordingly, it is required to produce a wide variety and various numbers of products, in order to produce the products dynamically in tandem with the market needs.

SUMMARY OF THE INVENTION

Cellular manufacturing in which a plurality of machines are integrated into one production cell, and production is performed on a process-by-process basis in units of the cellular manufacturing is proposed. According to the cellular manufacturing, the single production cell can produce a plurality of types of products. The number of the production cells can be increased or decreased in accordance with product quantity. The layout of the production cell can be changed depending on a change of the types of products to be produced.

Furthermore, cell control systems that control a plurality of machines installed in production sites through intranets, while receiving production plan commands from production planning systems over the Internet, are developed. The cell control system is expected to operate the machines by the commands from the production planning system situated in a place away from the production site, and to contribute to automatic collection and collective management of various types of information from each machine in real time.

In the above cell control systems, a specific operation software application is installed into the cell control system to establish intercommunication between each of the machines and the cell control system, and to operate each of the machines. In this case, information is required to be transmitted and received among a base software application and the operation software application of the cell control system and each of the machines. At this time, it is also required to manage the operation software application installed in the cell control system.

Considering the circumstances described above, an object of the present invention is to provide a machine system that can transmit and receive information among a base software application, an operation software application, and each machine, and manage the transmission and reception of the information.

An aspect of this disclosure may be a machine control computer communicatably connected to a machine. A base software application and an operation software application are installed in the computer.

The base software application includes:

a first communication unit being a program portion to enable a CPU of the computer to receive first machine information, which is specific to the machine, outputted from the machine;

a second communication unit being a program portion to enable the CPU of the computer to transmit second machine information specific to the operation software application to the operation software application; and an information conversion unit being a program portion to enable the CPU of the computer to convert the first machine information into the second machine information, based on a data model corresponding to a category of the machine.

The operation software application is a program using the second machine information as input information.

The data model has a data structure in which at least each individual physical element constituting the machine or various management elements of the machine is or are indicated by a node, and the first machine information is assigned to the node corresponding to the individual physical element or the various management elements.

Another aspect may be a machine control computer communicatably connected to at least two machines. A base software application and an operation software application are installed in the computer.

The base software application includes:

a first communication unit being a program portion to enable a CPU of the computer to receive first machine information, which are specific to each of the machines, outputted from each of the machines in association with identification information of each of the machines;

a second communication unit being a program portion to enable the CPU of the computer to transmit second machine information specific to the operation software application to the operation software application in association with the identification information of each of the machines; and an information conversion unit being a program portion to enable the CPU of the computer to convert the first machine information into the second machine information, based on a data model corresponding to a category of the machine.

The operation software application is a program using the second machine information as input information.

The data model has a data structure in which at least each individual physical element constituting the machine or various management elements of the machine is or are indicated by a node, and the first machine information is assigned to the node corresponding to the individual physical element or the various management elements.

Yet another aspect may be a machine control computer communicatably connected to a machine. A base software application and an operation software application are installed in the computer.

The base software application includes:

a first communication unit being a program portion to enable a CPU of the computer to receive first machine information, which is specific to the machine, outputted from the machine, and to transmit second command information specific to the machine to the machine in order to send a command to the machine;

a second communication unit being a program portion to enable the CPU of the computer to receive first command information specific to the operation software application from the operation software application, and to transmit second machine information specific to the operation software application to the operation software application; and an information conversion unit being a program portion to enable the CPU of the computer to convert the first machine information into the second machine information based on a data model corresponding to a category of the machine, and to convert the first command information into the second command information based on the data model.

The operation software application is a program for enabling the CPU of the computer to generate the first command information based on the second machine information and output the first command information.

The data model has a data structure in which at least each individual physical element constituting the machine or various management elements of the machine is or are indicated by a node, and the first machine information is assigned to the node corresponding to the individual physical element or the various management elements.

Yet another aspect may be a machine control computer communicatably connected to at least two machines. A base software application and an operation software application are installed in the computer.

The base software application includes:

a first communication unit being a program portion to enable a CPU of the computer to receive first machine information, which are specific to each of the machines, outputted from each of the machines in association with identification information of each of the machines, and to transmit second command information specific to each of the machines to each of the machines;

a second communication unit being a program portion to enable the CPU of the computer to receive first command information, which is specific to the operation software application, outputted from the operation software application in association with the identification information of each of the machines, and to transmit second machine information specific to the operation software application to the operation software application in association with the identification information of each of the machines; and an information conversion unit being a program portion to enable the CPU of the computer to convert the first machine information into the second machine information based on a data model corresponding to a category of the machine, and to convert the first command information into the second command information based on the data model.

The machine has the function of outputting a state of the machine to the computer as the first machine information, and the function of determining an operation to be performed by the machine based on the second command information.

The operation software application is a program for enabling the CPU of the computer to generate the first command information for each of the machines based on the second machine information inputted in association with the identification information of each of the machines, and output the first command information in association with the identification information of each of the machines.

The data model has a data structure in which at least each individual physical element constituting the machine or various management elements of the machine is or are indicated by a node, and the first machine information is assigned to the node corresponding to the individual physical element or the various management elements.

According to the aspects, since the first machine information relating to a structure element of the machine received from the machine is converted into the second machine information including information about the structure element from which the first machine information derives, and the second machine information is transmitted to the operation software application, the processing speed of the operation software application (for example, analysis, tabulation, and the like) can be increased. The transmission and reception of information among the base software application, the operation software application, and each of the machines allows storing and managing the information at the time of the transmission and reception, while operating each of the machines. For example, the transmission and reception of the information may be limited based on certification record information. For example, fee payment information on the operation software application or the base software application may be obtained and outputted to the communication units.

The objects, features, and advantages of the present invention and other objects, features, and advantages thereof will be more apparent from the following detailed description of a typical embodiment of this disclosure accompanied with the attached drawings.

DETAILED DESCRIPTION OF THE INVENTION

Figure 1:
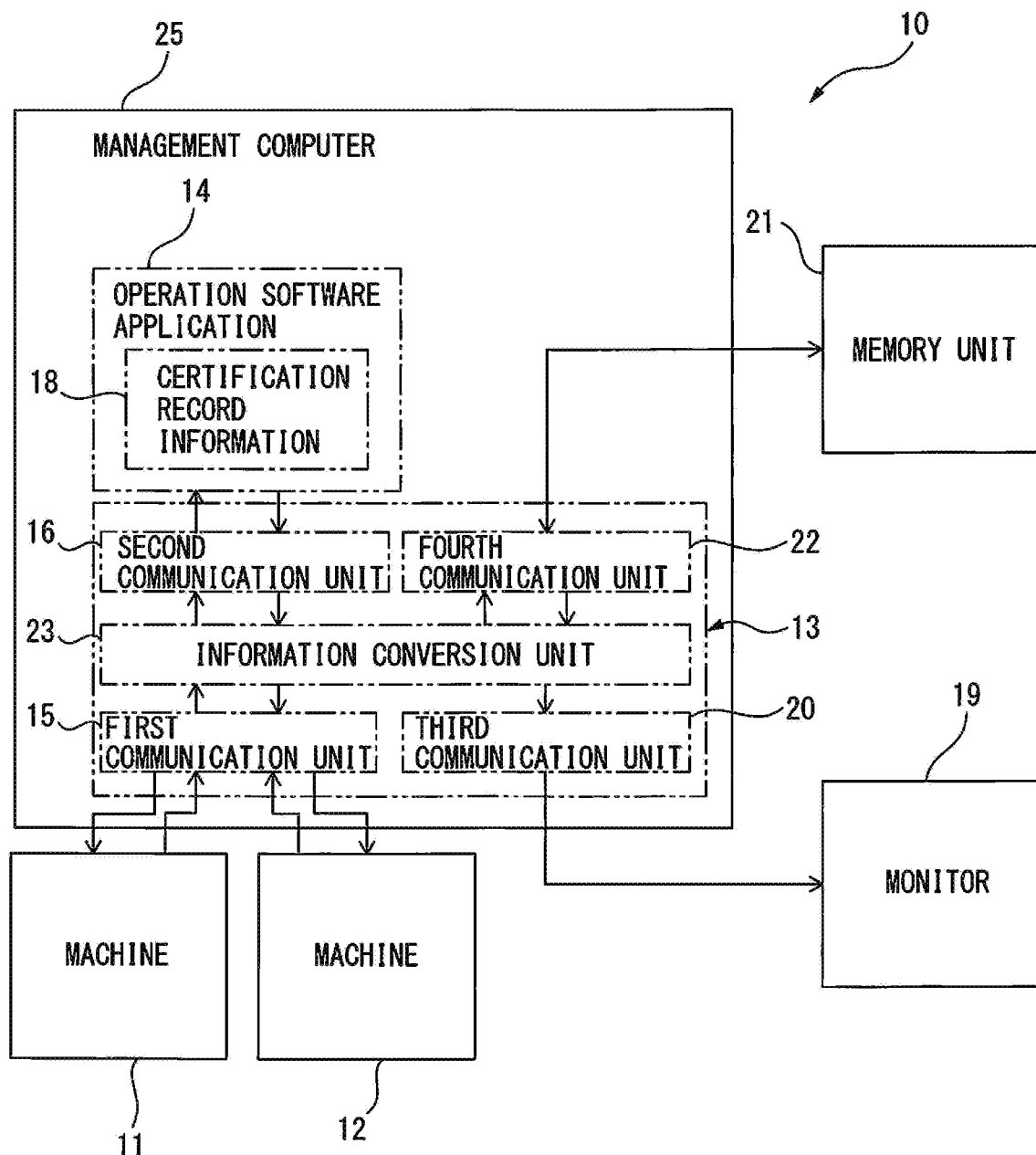
FIG. 1 is a block diagram schematically showing the configuration of a machine system according to an embodiment.

An embodiment of this disclosure will be described with reference to the drawings. In the drawings, the same components and functional parts are indicated with the same reference numerals. For ease of understanding, the scales of the drawings are modified in an appropriate manner. The embodiment shown in the drawings is just an example to embody the present invention, and the present invention is not limited to the embodiment.

FIG. 1 is a block diagram schematically showing the configuration of a machine system according to an embodiment.

Referring to FIG. 1, a machine system 10 according to the embodiment includes two machines 11 and 12 and a machine management personal computer (hereinafter abbreviated as management computer) communicatably connected to the machines 11 and 12. A base software application 13 and an operation software application 14 are installed in the management computer 25. Although FIG. 1 includes the two machines 11 and 12, the number of machines is not limited as long as at least one machine is present.

The base software application 13 includes a first communication unit 15, which is a program portion to enable a CPU (not shown) of the management computer 25 to receive first machine information outputted from each of the machines 11 and 12, and to transmit second command information to each of the machines 11 and 12. Furthermore, the base software application 13 includes a second communication unit 16, which is a program portion to enable the CPU of the management computer 25 to receive first command information from the operation software application 14, and to transmit second machine information to the operation software application 14. The base software application 13 also includes a memory processor (not shown), which is a program portion to enable the CPU of the management computer 25 to store the first machine information, the second machine information, the first command information, and the second command information in a memory (not shown) of the management computer 25. The memory is installed in the management computer 25 in this embodiment, but may be disposed outside the management computer 25.

The first machine information and the second machine information are information indicating the states of the machines 11 and 12. The first command information and the second command information are information representing the contents of commands to be given to the machines 11 and 12. Concrete examples of the information will be described later.

Each of the machines 11 and 12 has the function of outputting the state of the machine 11 or 12 to the management computer 25 as the first machine information, and the function of determining an operation to be performed by the machine 11 or 12 based on the second command information. In other words, upon receiving the second command information, each of the machines 11 and 12 performs the operation corresponding to the contents of the second command information. The machines 11 and 12 are machines in different categories from each other. For example, the machine 11 is a NC machine tool, and the machine 12 is an industrial robot. Further splintering the category of NC machine tools, the machine 11 may be a fraise, and the machine 12 may be a lathe. Further splintering the category of industrial robots, the machine 11 may be a horizontal articulated robot, and the machine 12 may be a vertical articulated robot.

A machine of a different category from NC machine tools, industrial robots, or the like, for example, a peripheral device such as a PLC or a laser device may be connected to the management computer 25. Furthermore, one or more machines 11, one or more machines 12, and one or more machines of another type may be connected to the management computer 25.

Furthermore, the operation software application 14 is a program that enables the CPU of the management computer 25 to generate the first command information for each of the machines 11 and 12 based on the second machine information inputted from the second communication unit 16, and output the first command information.

More specifically, in this embodiment, the first communication unit 15 is preferably a program portion that enables the CPU of the management computer 25 to receive the first machine information outputted from each of the machines 11 and 12 in association with identification information of each of the machines 11 and 12, and to transmit the second command information to each of the machines 11 and 12. The second communication unit 16 is preferably a program portion that enables the CPU of the management computer 25 to receive the first command information from the operation software application 14 in association with the identification information of each of the machines 11 and 12, and to transmit the second machine information to the operation software application 14 in association with the identification information of each of the machines 11 and 12. The identification information of each of the machines 11 and 12 is, for example, an identification number assigned to each of the machines 11 and 12.

The memory of the management computer 25 preferably stores the first machine information, the second machine information, the first command information, and the second command information in association with the identification information of each of the machines 11 and 12.

Each of the machines 11 and 12 can output the state of the machine 11 or 12 to the management computer 25 as the first machine information in association with the identification information of each of the machines 11 and 12, and determine an operation to be performed by the machine 11 or 12 based on the second command information.

The operation software application 14 may be a program that enables the CPU of the management computer 25 to generate the first command information for each of the machines 11 and 12 based on the second machine information inputted from the second communication unit 16 in association with the identification information of each of the machines 11 and 12, and to output the first command information in association with the identification information of each of the machines 11 and 12.

In the embodiment shown in FIG. 1, the management computer 25 receives the first machine information indicating the states of the machines outputted from each of the machines 11 and 12. The management computer 25 converts the first machine information into the second machine information by the base software application 13, and outputs the second machine information of each of the machines 11 and 12 to the operation software application 14. After that, the management computer 25 generates the first command information based on the second machine information by the operation software application 14. The management computer 25 converts the first command information into the second command information by the base software application 13, and transmits the second command information to each of the machines 11 and 12.

In this embodiment, however, the transmissions of the first command information and the second command information, as described above, are not indispensable. The operation software application 14 may be a program that uses the second machine information outputted from the second communication unit 16, e.g. information of an XML (Extensible Markup Language) format, a JSON (JavaScript Object Notation) format, or the like, as input information. For example, the operation software application 14 may be a software application such as an analysis software application or a tabulation display software application. In this case, the first communication unit 15 may enable the CPU of the management computer 25 to receive the first machine information outputted from each of the machines 11 and 12, e.g. numerical data, text data, or the like. On the other hand, the second communication unit 16 may enable the CPU of the management computer 25 to transmit the second machine information to the operation software application 14.

The first machine information and the second command information to be transmitted and received between the management computer 25 and each of the machines 11 and 12 are information specific to each of the machines 11 and 12, for example, numerical data, text data, or the like. On the other hand, in the management computer 25, the second machine information and the first command information to be inputted and outputted between the base software application 13 and the operation software application 14 are information specific to the operation software application 14, for example, information of an XML format, a JSON format, or the like.

Therefore, the base software application 13 according to this embodiment further includes an information conversion unit 23, which is a program portion to enable the CPU of the management computer 25 to convert the first machine information into the second machine information and to convert the first command information into the second command information.

Figure 2:
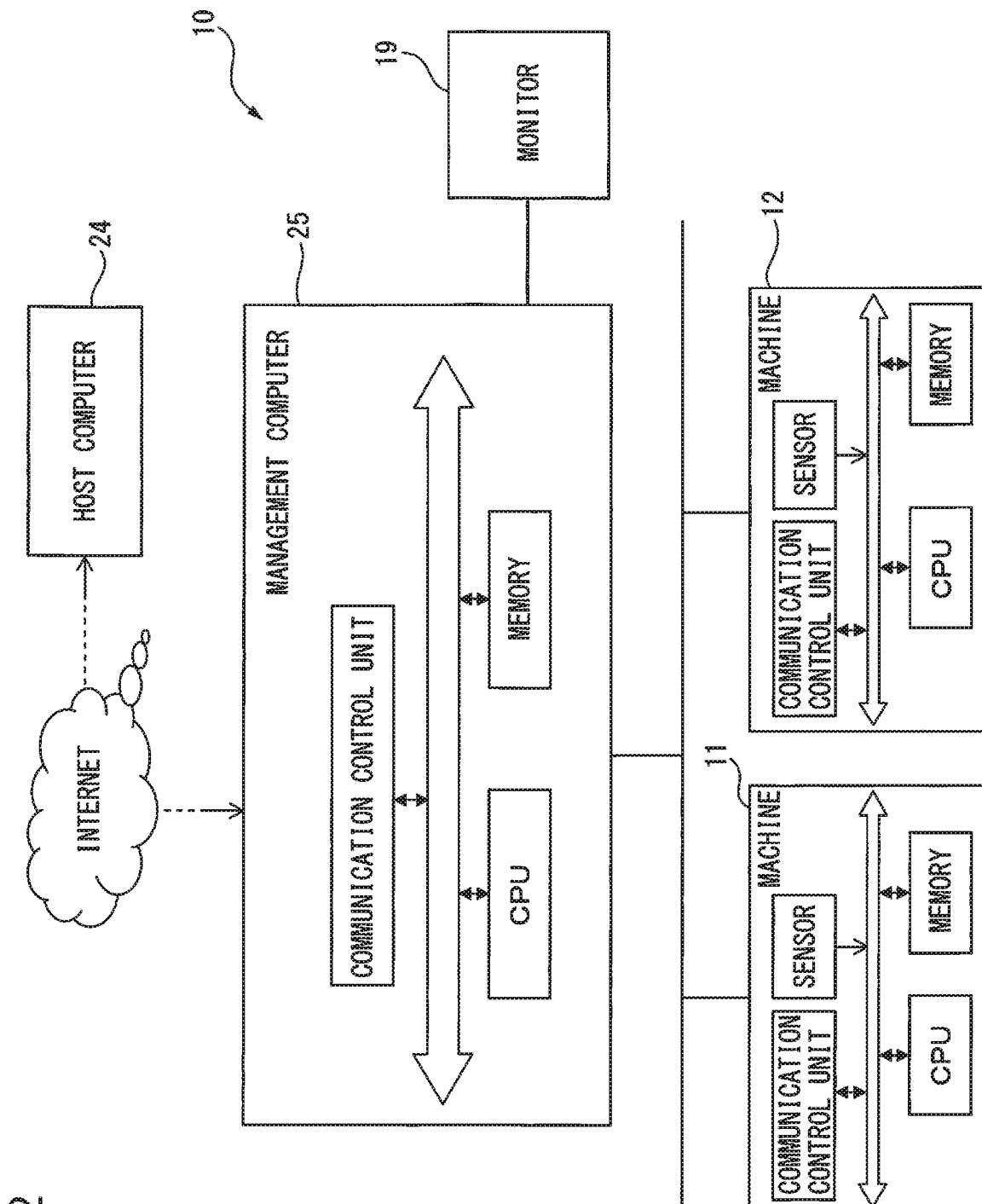
FIG. 2 is a drawing of hardware configurations of a management computer and machines shown in FIG. 1.

As shown in FIG. 2, the machines 11 and 12 and the management computer 25 are configured in a computer system including memories, CPUs (central processing units), communication control units, and the like connected through buses. The memories include ROMs (read only memories), RAMs (random access memories), and the like. The base software application 13 and the operation software application 14 according to this embodiment are appropriately stored in the ROM or RAM of the management computer 25. The memories are used for storing the first machine information, the second machine information, the first command information, and the second command information. The first communication unit 15, the second communication unit 16, and the information conversion unit 23 are program portions (so-called modules) included in the base software application 13 stored in the ROM or RAM. To achieve operations or processes based on the program portions, the CPU of the management computer 25 executes each module of the base software application 13 and the operation software application 14.

Figure 3:
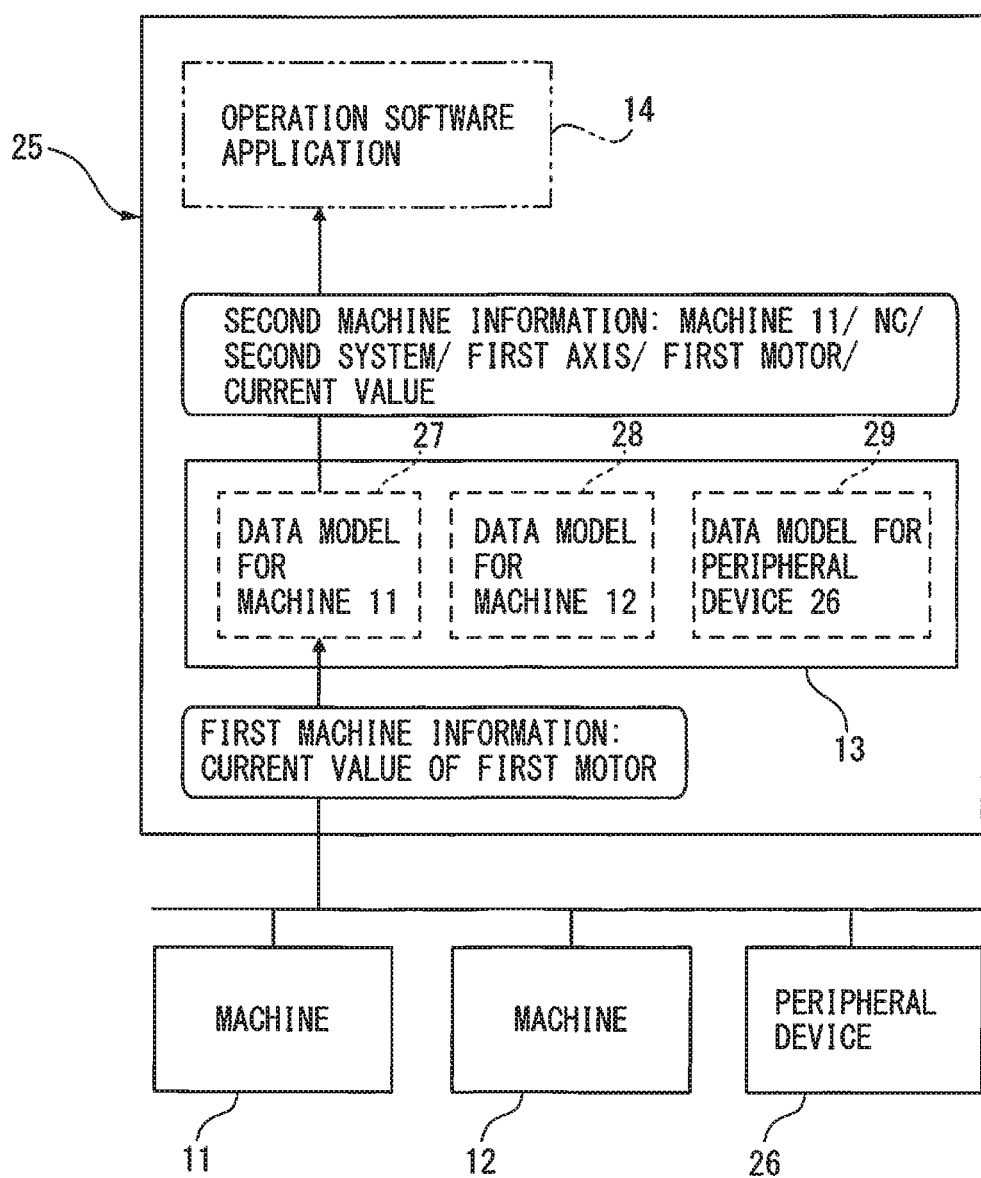
FIG. 3 is a drawing schematically showing an example of a state of converting first machine information into second machine information based on data models.

An example of an aspect in which the CPU of the management computer 25 converts first machine information specific to the machine 11 into second machine information specific to the operation software application 14, and outputs the second machine information to the operation software application 14 will be described. FIG. 3 is a drawing schematically showing this aspect.

As shown in FIG. 3, the machines 11 and 12 such as a machine tool and an industrial robot, a peripheral device 26, and the like are communicatably connected to the management computer 25. First machine information is outputted from each of the machines 11 and 12 and the peripheral device 26 to the management computer 25. The management computer 25 can recognize which machine the first machine information belongs to from machine-specific identification information associated with the first machine information. However, the first machine information transmitted from one machine 11 to the management computer 25 is not limited to just one kind of information.

For example, when the machine 11 is a multipath controllable multiaxial NC machine tool, and a NC (numerical controller) of the machine 11 controls a first axis of the machine 11 using a first motor and a second motor according to a second system program, current values of the first motor and the second motor are each transmitted to the management computer 25, as first machine information. Furthermore, if the NC executes a first system program simultaneously with the second system program, a current value of a motor of each axis controlled by the first system program is also transmitted to the management computer 25, as first machine information. Since the first machine information just indicates which motor the current value corresponds to, it is not easy to know that the current value of the motor corresponds to which axis controlled by which system program executed by the NC of the machine 11. In other words, the first machine information is machine-specific information, and is not structured data (so-called definite format data). Such first machine information is difficult to deal with in data analysis, when the operation software application 14 is, for example, a machine information analysis software application, a machine information tabulation display software application, or the like. In order to allow the operation software application to deal with the machine-specific information in real time, the machine-specific first machine information is required to be converted into second machine information specific to the operation software application 14.

For this reason, the memory of the management computer 25 according to this embodiment stores data models 27, 28, 29, and the like in advance on a category-by-category basis such as NC machine tools, industrial robots, and peripheral devices, for each of the machine 11, the machine 12, and the peripheral device 26 of different categories. FIG. 3 shows an aspect in which first machine information outputted from the machine 11, i.e., a NC machine tool, is converted into second machine information based on the data model 27 corresponding to the machine 11. However, this is just an example, as a matter of course. Data models are generated differently from one machine category to another, and stored in advance in the memory of the management computer 25. The data models may be appropriately added or changed. Data models corresponding to machine categories different from the machine 11, the machine 12, and the peripheral device 26 may be also stored in advance in the memory of the management computer 25.

Figure 4A:
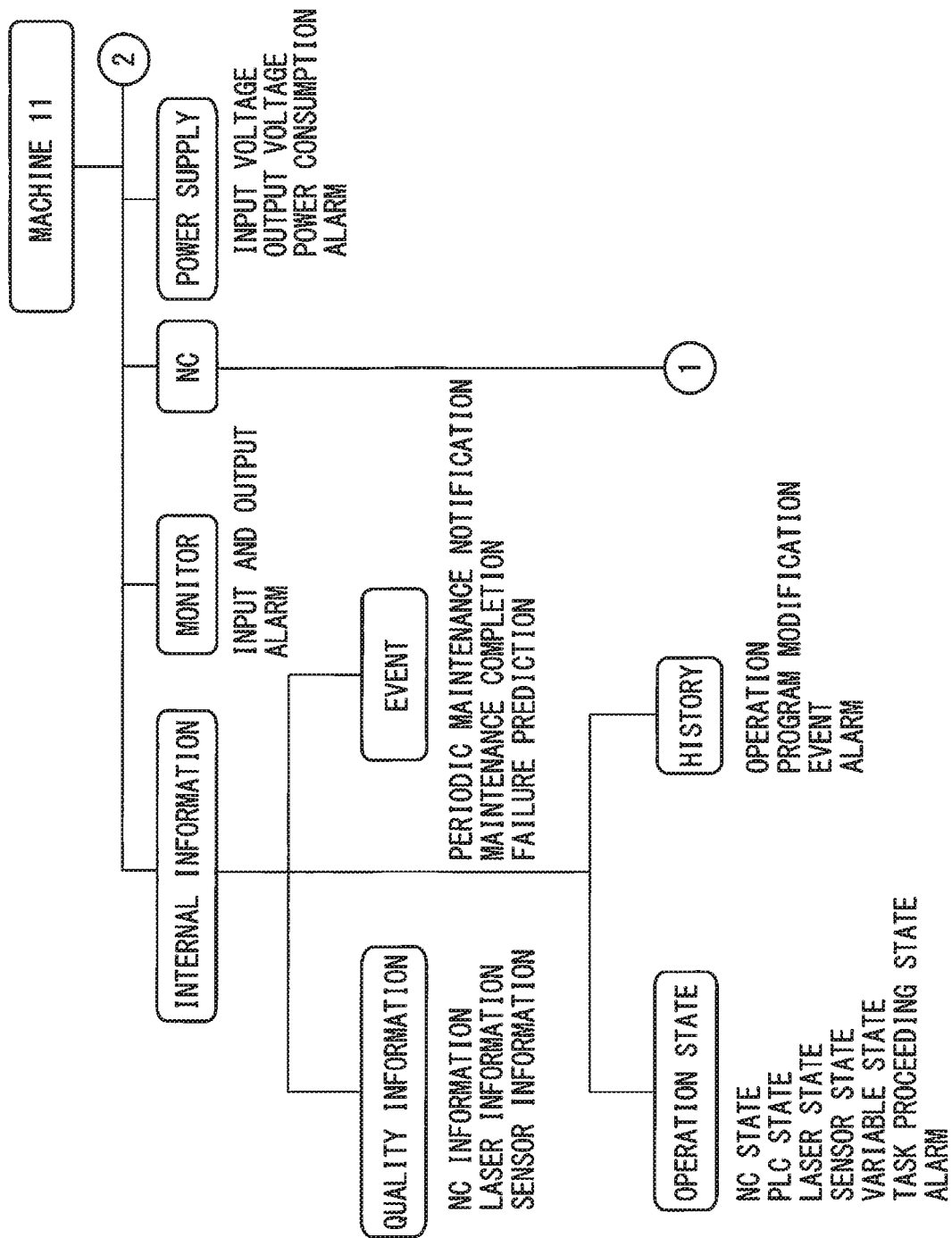
FIGS. 4A to 4C are drawings of an example of a data model for NC machine tools.
Figure 4B:
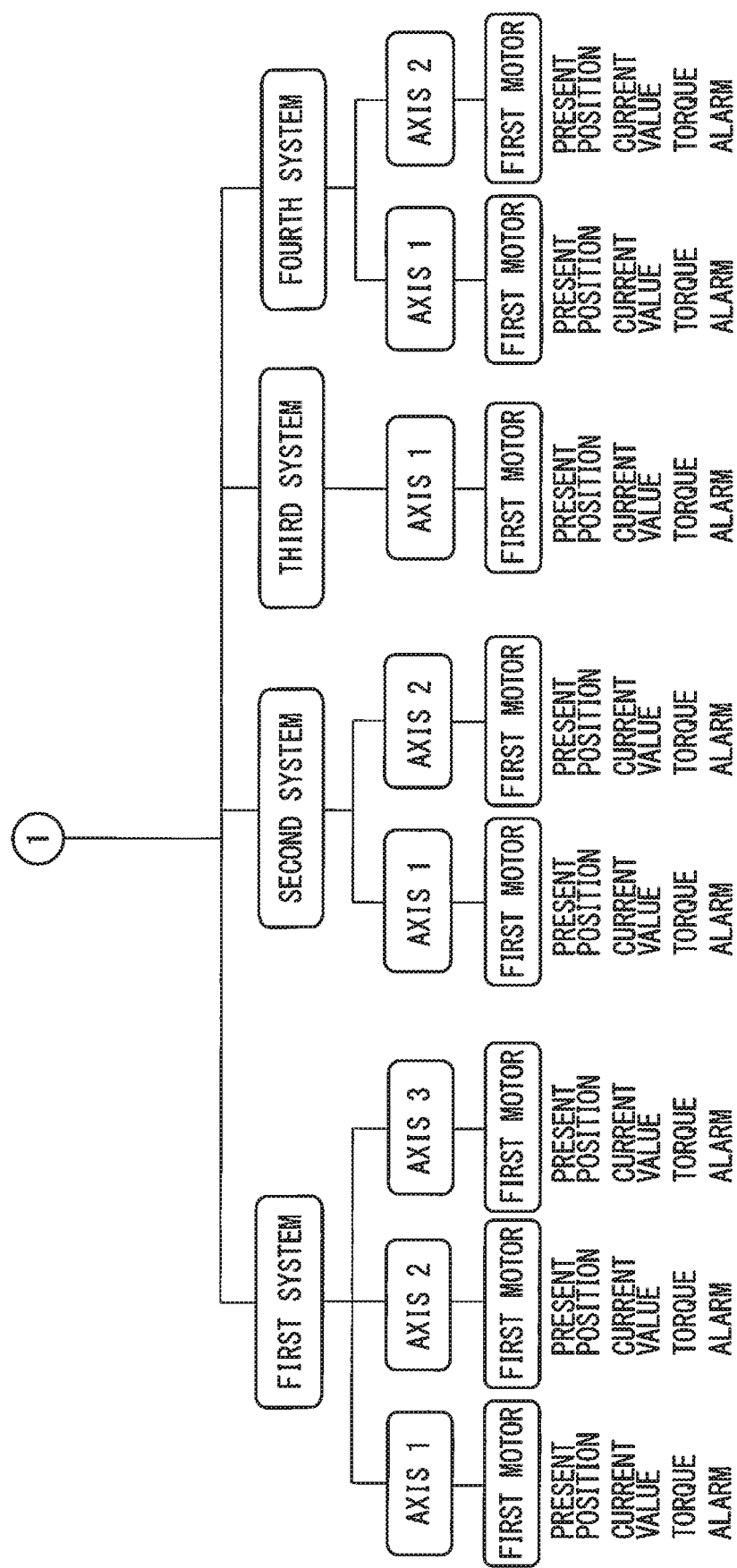
Figure 4C:
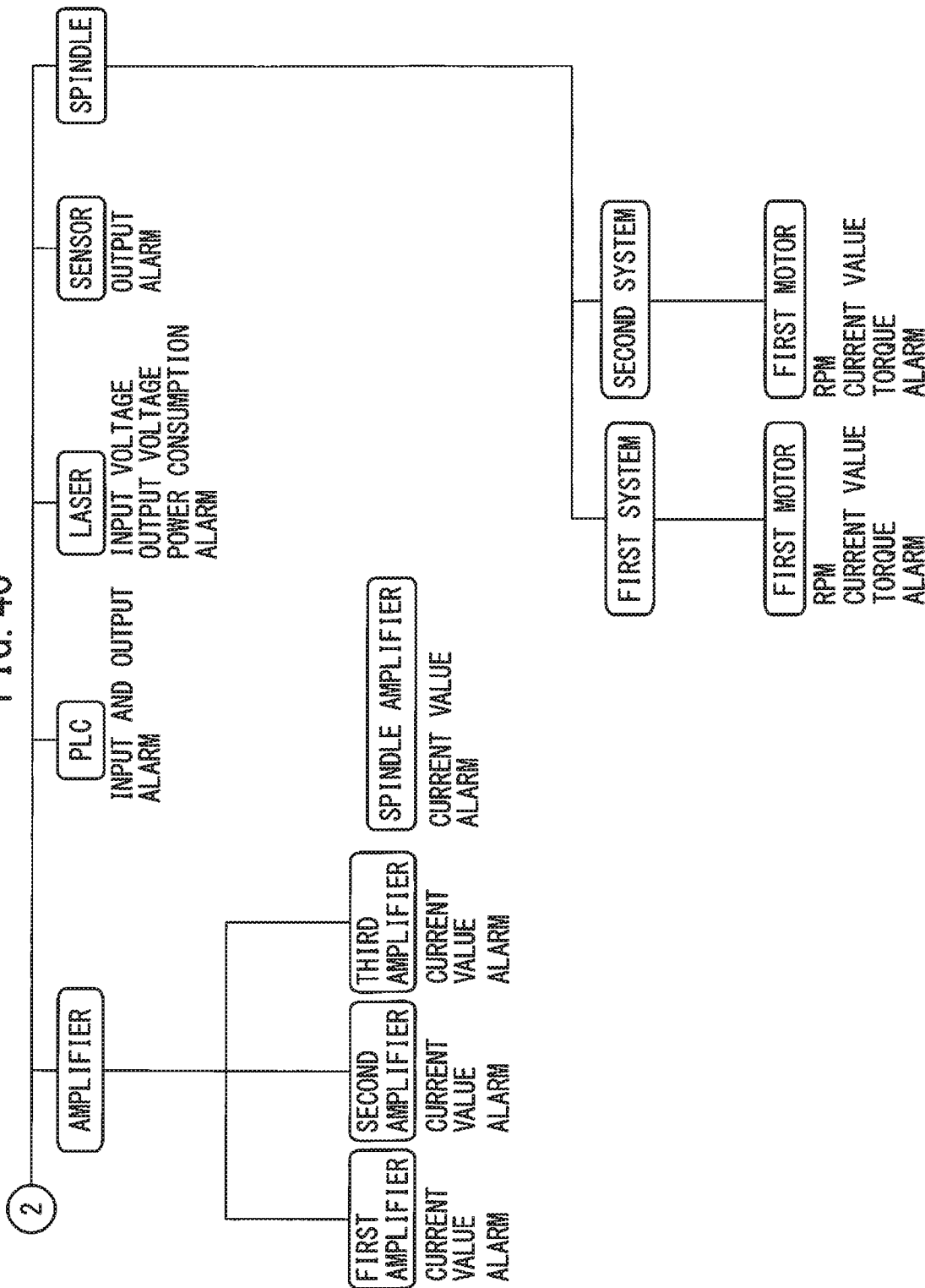

FIGS. 4A to 4C are drawings of an example of a data model for the machine 11, i.e., a NC machine tool. When the machine 11 is a multiaxial NC machine tool, as described above, the data model 27 has a graph-type data structure, as shown in FIGS. 4A to 4C, in which at least physical elements constituting NC machine tools or various management elements to be managed by the NC machine tools are indicated by nodes. In the data model of FIGS. 4A to 4C, information (hereinafter referred to as identification information) to identify each node corresponding to each individual physical element and various management elements is a text designation, but may be an identification number (for example, a number assigned to each system, axis, motor, or the like in FIGS. 4A to 4C) corresponding to the text designation. In this application, "physical elements" refer to equipment operated by physical energy (electricity, heat, power, and the like), out of components of machines.

As examples of individual physical elements constituting NC machine tools, there are, for example, a display unit, a NC, a power supply, an amplifier, a PLC, a spindle, a feed shaft, a motor, and the like. On the other hand, as various management elements of machines, there are information directly relating to the physical elements, such as a current value, a position, and a torque, and information indirectly relating to the physical elements, such as a production state, an operation state, quality information, and an operation history. The structure of the data model 27 is just an example, but may have a network-type data structure, instead of the graph-type (including a tree-type) structure.

The data model 27 may have another structure, as long as the data model 27 is constituted of nodes corresponding to as least physical elements or management elements. In other words, the data model 27 is not necessarily constituted of only nodes corresponding to physical elements and management elements, as shown in FIGS. 4A to 4C, but, for example, may be constituted of only nodes corresponding to the physical elements or only nodes corresponding to the management elements. The data model 27 may appropriately include a node corresponding to a different element from the physical elements or the management elements, a blank node corresponding to no element, or the like.

When the management computer 25 receives a current value of a first motor of a first axis of a second system from the machine 11, i.e., a NC machine tool, the CPU of the management computer 25 converts the received "current value of first motor", i.e., first machine information, into "machine 11/NC/second system/first axis/first motor/current value", i.e., second machine information including information about a machine structure element being a source of the current value, by the base software application 13 with reference to the data model 27 shown in FIGS. 4A to 4C. The information conversion operation will be described later in detail, by taking a robot as an example.

The conversion process facilitates identifying the information about the current value outputted from the machine 11 as the current value of the first motor of the first axis controlled by the second system program executed by the NC of the machine 11. In other words, in order to allow the operation software application 14 to easily deal with first machine information from the machines 11 and 12, the first machine information can be converted into definite format information (so-called structured data) containing the first machine information and information about all elements from which the first machine information derives.

The current value of the motor is described above as a part of the first machine information and the second machine information, but the present invention is not limited thereto. A part of the first machine information and the second machine information may include information about, for example, an operating time, a vibration value, a generated temperature, a sound volume, position information, and the like of each of the machines 11 and 12.

As described above, when the first machine information is converted into the second machine information according to the information conversion unit 23 of the base software application 13, the management computer 25 performs the conversion based on the machine category-specific data models 27 to 29 stored in the memory of the management computer 25.

Figure 5:
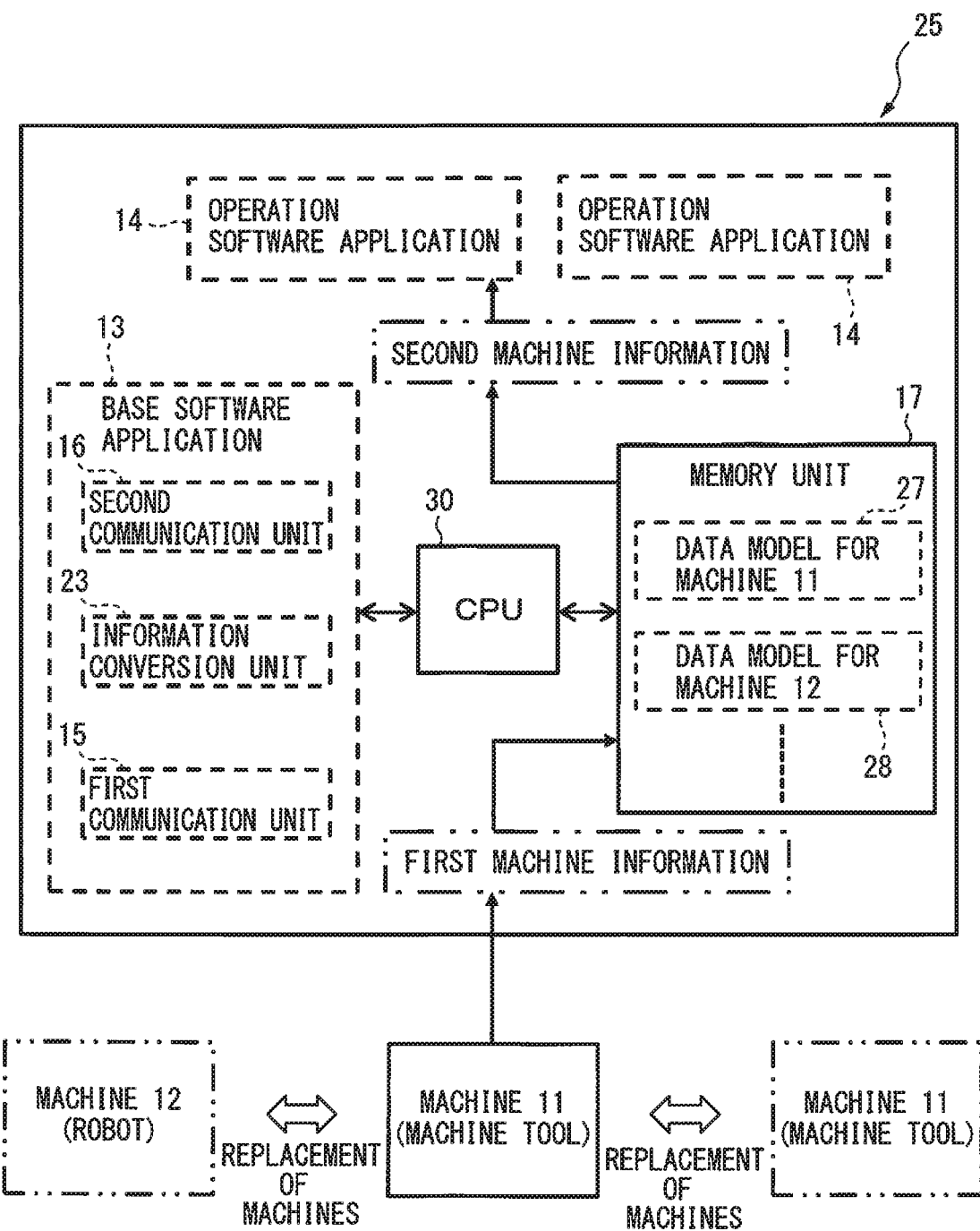
FIG. 5 is a block diagram of a configuration example in which a CPU of the management computer performs the machine information conversion process shown in FIG. 3.
Figure 6:
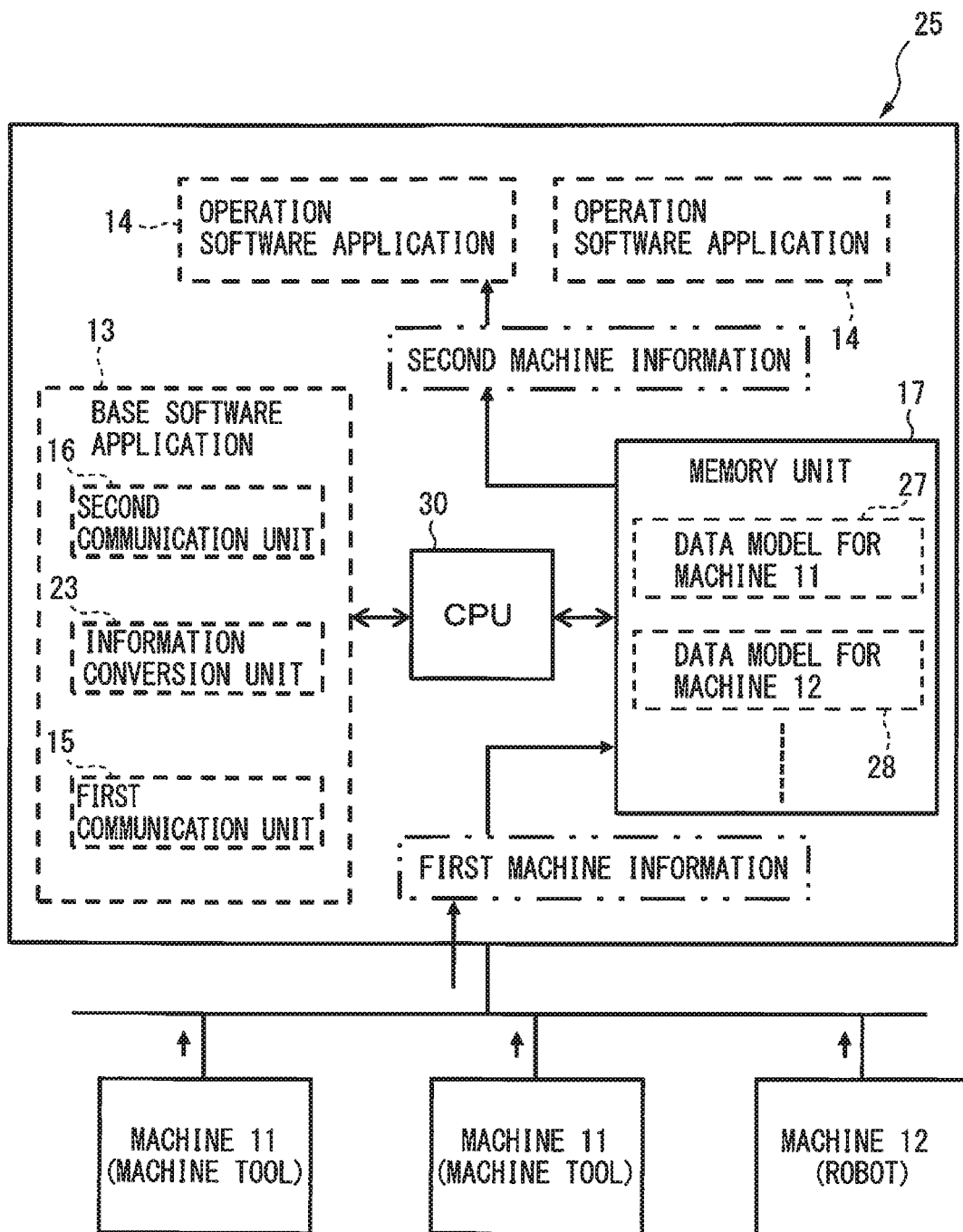
FIG. 6 is a block diagram of another configuration example different from FIG. 5.
Figure 7:
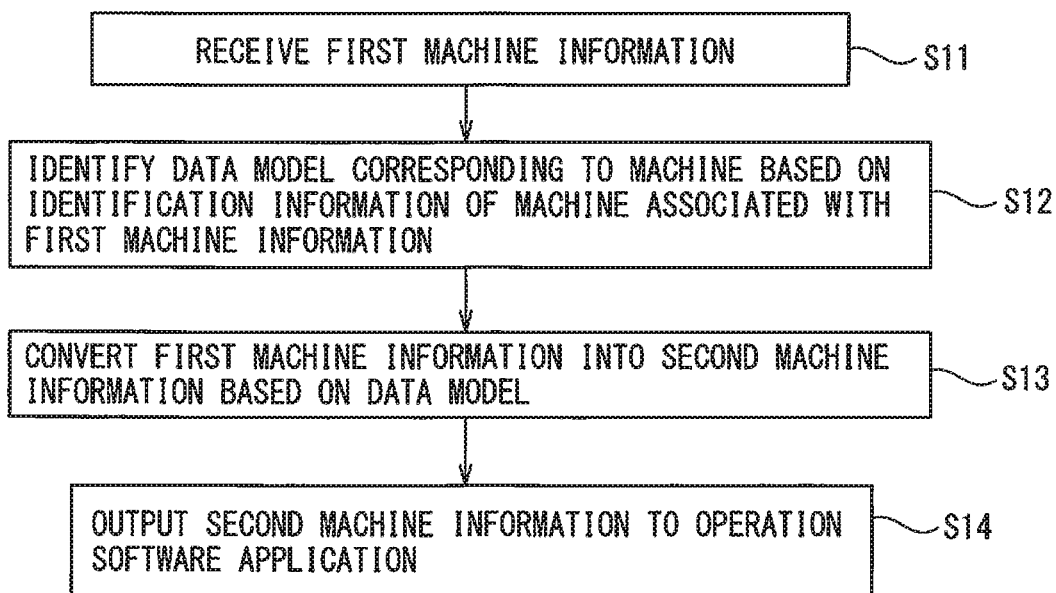
FIG. 7 is a flowchart of the operation of the management computer having the configuration of FIG. 5 or 6, including a machine information conversion step.

FIG. 5 is a block diagram of a configuration example in which a CPU 30 of the management computer 25 performs the machine information conversion process shown in FIG. 3. FIG. 6 is a block diagram of another configuration example different from FIG. 5. A memory unit 17 is a storage area in the above-described memory of the management computer 25. FIG. 7 is a flowchart of the operation of the management computer 25 having the configuration of FIG. 5 or 6, including a machine information conversion step.

As shown in FIG. 7, when the management computer 25 of FIG. 5 or 6 receives first machine information (step S11), the CPU 30 of the management computer 25 identifies a data model corresponding to a machine from the memory (memory unit 17 of FIG. 5 or 6) of the management computer 25 based on identification information of the machine associated with the received first machine information (step S12). The CPU of the management computer 25 converts the first machine information into second machine information based on the identified data model (step S13), and outputs the second machine information to the operation software application 14 (step S14). In step S14, the second machine information is preferably outputted to the operation software application 14 in association with the identification information of the identified machine. The above operation is realized by enabling the CPU 30 of the management computer 25 to execute the information conversion unit 23 of the base software application 13.

Although the conversion of the machine information is described above, the conversion of the command information can be performed in the same manner. When first command information is converted into second command information by the information conversion unit 23 of the base software application 13, the management computer 25 performs the conversion based on the machine category-specific data models 27 to 29 stored in the memory of the management computer 25.

Figure 8:
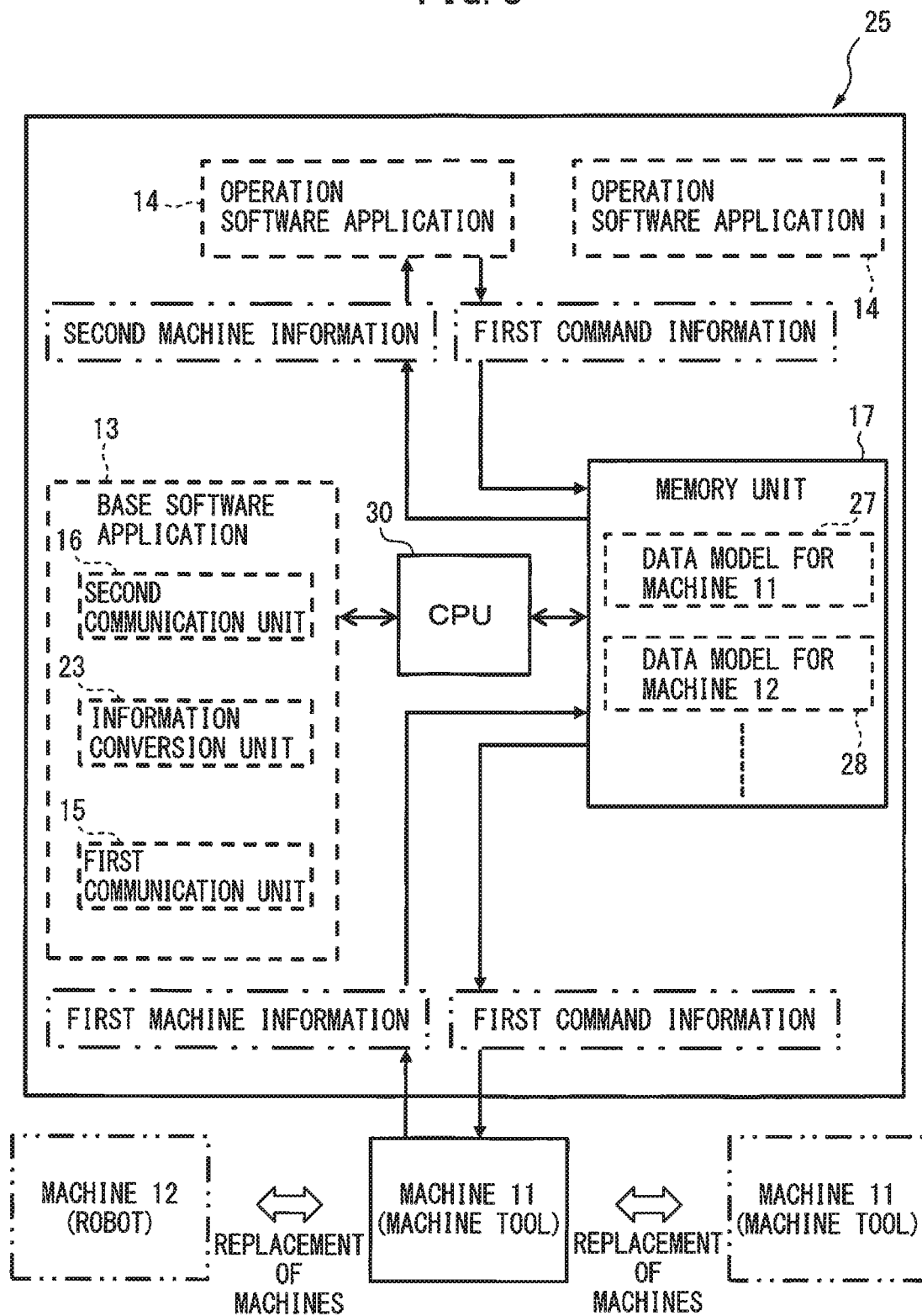
FIG. 8 is a block diagram of a configuration example in which the CPU of the management computer performs a command information conversion process.
Figure 9:
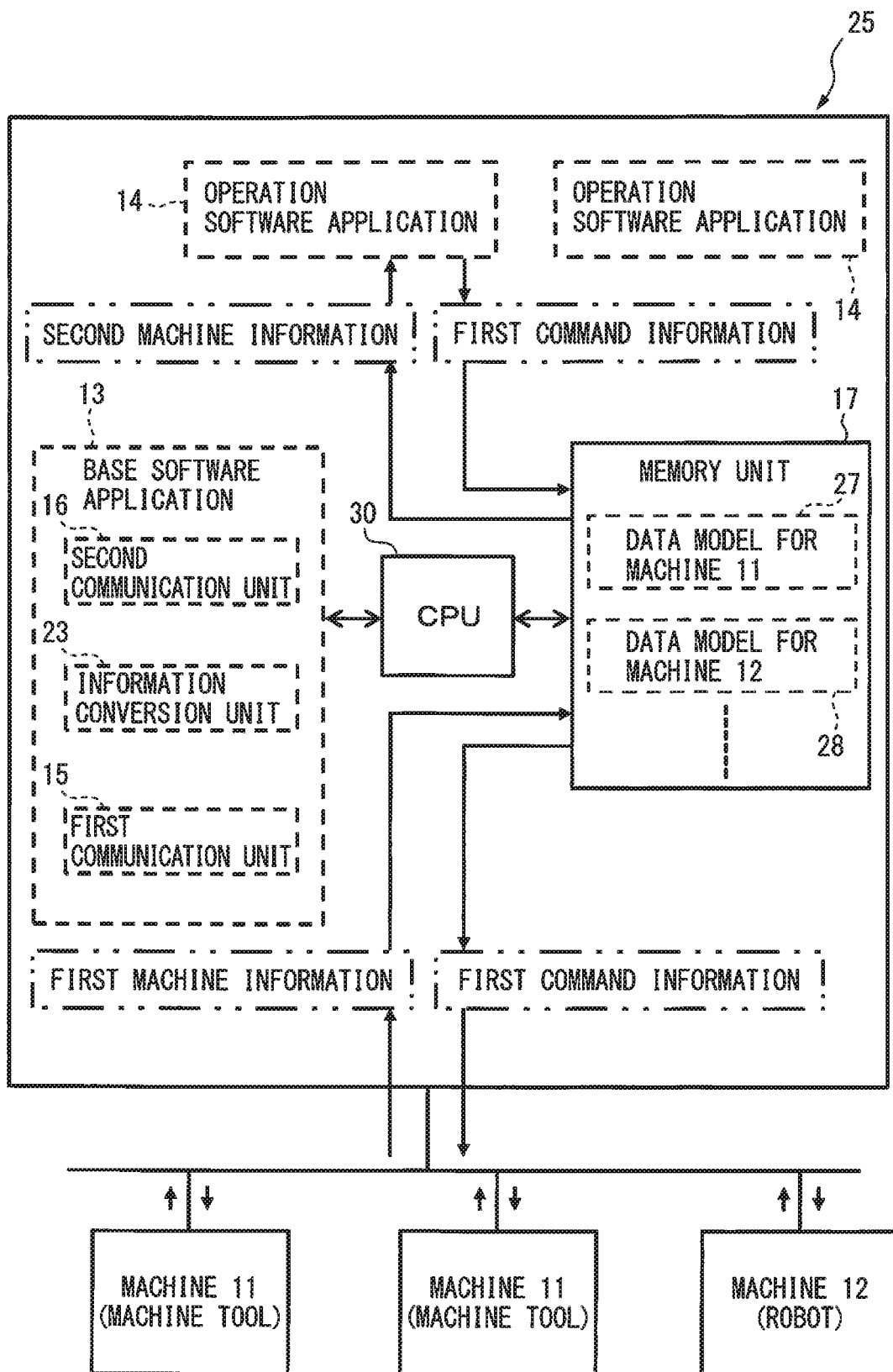
FIG. 9 is a block diagram of another configuration example different from FIG. 8.
Figure 10:
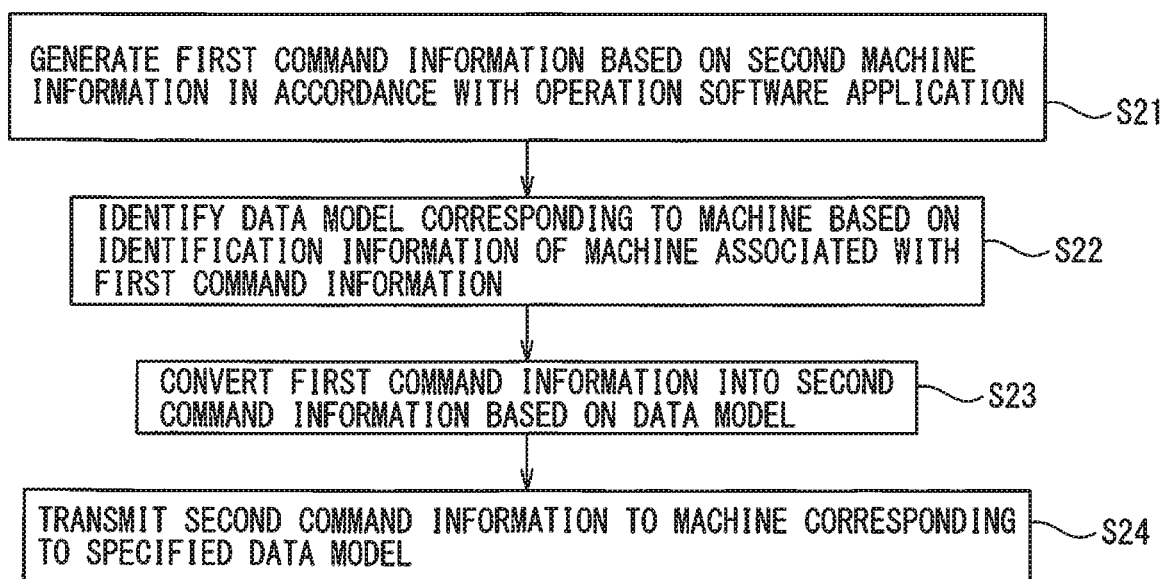
FIG. 10 is a flowchart of the operation of the management computer having the configuration of FIG. 8 or 9, including a command information conversion step.

FIG. 8 is a block diagram of a configuration example in which the CPU 30 of the management computer 25 performs a command information conversion process. FIG. 9 is a block diagram of another configuration example different from FIG. 8. FIG. 10 is a flowchart of the operation of the management computer 25 shown in FIG. 8 or 9, including a command information conversion step.

As shown in FIG. 10, the CPU 30 of the management computer 25 generates first command information based on second machine information by the operation software application 14 (step S21). At this time, machine-specific identification information is preferably associated with the generated first command information. Furthermore, the CPU 30 of the management computer 25 identifies a data model corresponding to a machine from the memory (memory unit 17 of FIG. 8 or 9) of the management computer 25 based on the identification information of the machine associated with the generated first command information (step S22). The management computer 25 converts the first command information into second command information based on the identified data model (step S23), and transmits the second command information to the machine corresponding to the identified data model (step S24). The above operation is realized by enabling the CPU 30 of the management computer 25 to execute the information conversion unit 23 of the base software application 13.

In the above example of the multiaxial NC machine tool, the first command information that indicates what operation is commanded to which device included in which machine, e.g. "machine 11/ NC/second system/first axis/first motor/current command value", can be converted into the second command information, e.g. "current command value", based on the data model 27. The current command value can be outputted to an amplifier to supply power to the first motor for driving the first axis of the second system of the NC in the machine 11.

In each configuration example of FIG. 5 or 8, the management computer 25 can replace the connected machine 11 with a machine 12 (robot) of a different category from the machine 11, or with a machine (machine tool) of the same category as the machine 11. As in the case of the configuration examples of FIGS. 6 and 9, a plurality of machines, for example, two machines 11 (machine tools) and one machine 12 (a robot) may be connected to the management computer 25. As described above, one or more machines can be connected to the management computer 25. The management computer 25 can replace a connected machine with another machine of the same category as the machine, or with another machine of a different category from the machine. In addition to a connected machine, the management computer 25 can be connected to another machine of the same category as the machine, or another machine of a different category from the machine.

Therefore, the memory unit 17 of the management computer 25 stores the data models 27 and 28 and the like for the machine 11, the machine 12, and the like of different categories, which could be possibly connected.

Furthermore, even if a plurality of machines 11 (machine tools) or a plurality of machines 12 (robots) to be replaced by or connected to the management computer 25 are machines of the same category, physical elements constituting the machines may be different from machine to machine. Furthermore, various management elements including a production state, a failure state, and the like to be managed by the machines may be different from machine to machine.

Figure 11A:
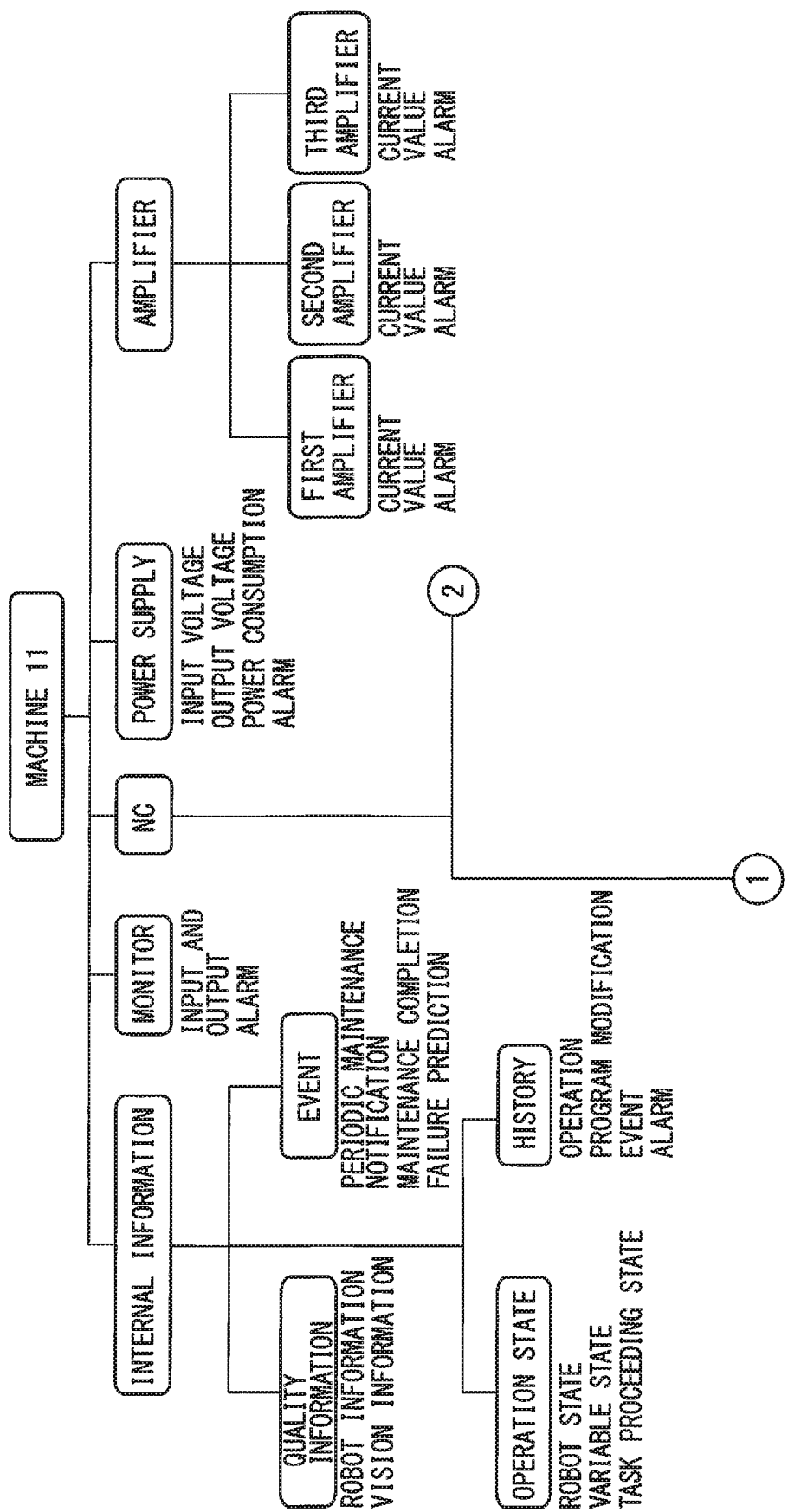
FIGS. 11A to 11C are drawings of an example of a data model for robots.
Figure 11B:
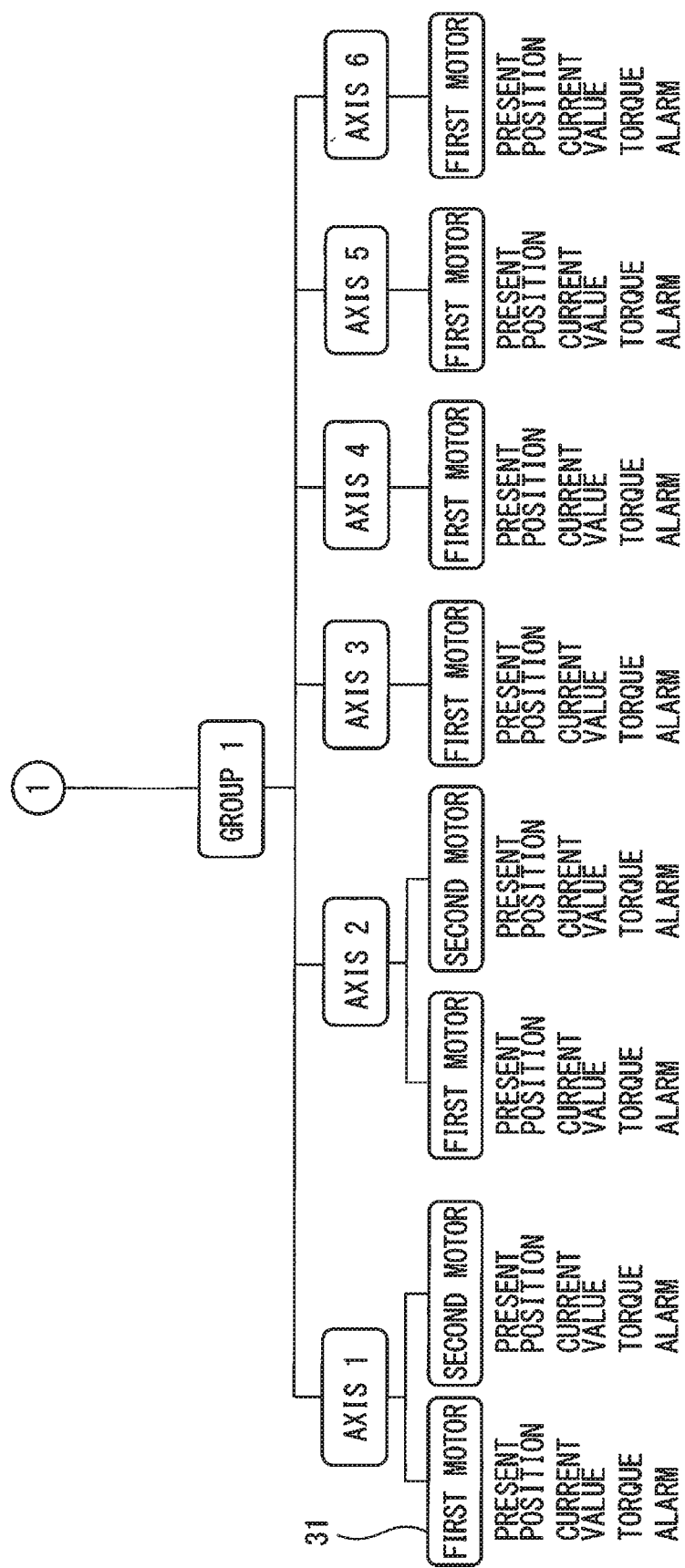
Figure 11C:
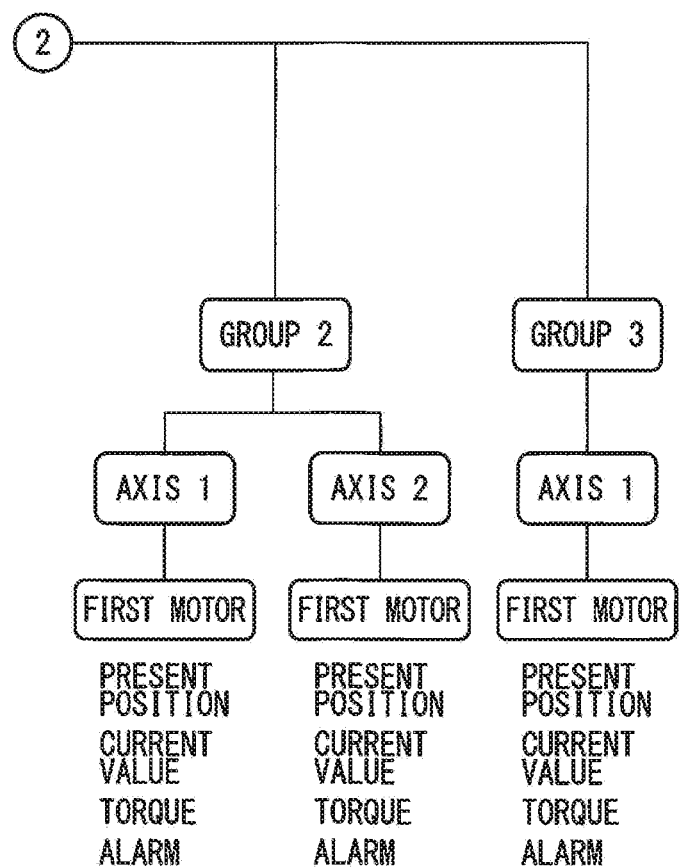

Therefore, each of the data models 27, 28, and the like is sharable among all machines of the same category that could be replaced or connected. FIGS. 4A to 4C show a data model for NC machine tools, as the data model 27 for the machine 11, and the data model of FIGS. 4A to 4C is also generated as a sharable data model, as described above. FIGS. 11A to 11C are drawings of an example of the data model 28 for the machine 12, i.e., a robot. The data model for robots shown in FIGS. 11A to 11C is also generated as a sharable data model that is sharable among all robots that could be replaced by or connected to the management computer 25.

As shown in FIGS. 11A to 11C, the data model 28 for the machine 12, i.e., a robot, has a graph-type data structure in which, at least, individual physical elements constituting robots or various management elements to be managed by the robots are indicated by nodes. The structure of the data model 28 is just an example, and the data model 28 may have a network-type data structure, instead of the graph-type (including tree-type) data structure. In the data model of FIGS. 11A to 11C, identification information to identify each of the nodes corresponding to the individual physical elements and the various management elements is a text designation, but may be an identification number (for example, a number assigned to each of groups, axes, motors, and the like of the robot in FIGS. 11A to 11C) corresponding to the text designation.

"Groups" represented in the data model for robots shown in FIGS. 11A to 11C refer to the classification of various operations of the robots. As the types of the operations of the robots, there are operations of each axis of robot bodies, operations of each axis of tools attached to the robot bodies, operations of each axis of carriages on which the robot bodies are installed in a movable manner, and the like, and such various operations are grouped.

Furthermore, in the data model (data model 28) for robots as shown in FIGS. 11A to 11C and the data model (data model 27) for NC machine tools as shown in FIGS. 4A to 4C, information (first machine information in this embodiment) about each individual physical element or various management elements corresponding to a node can be assigned to the node.

Figure 13A:
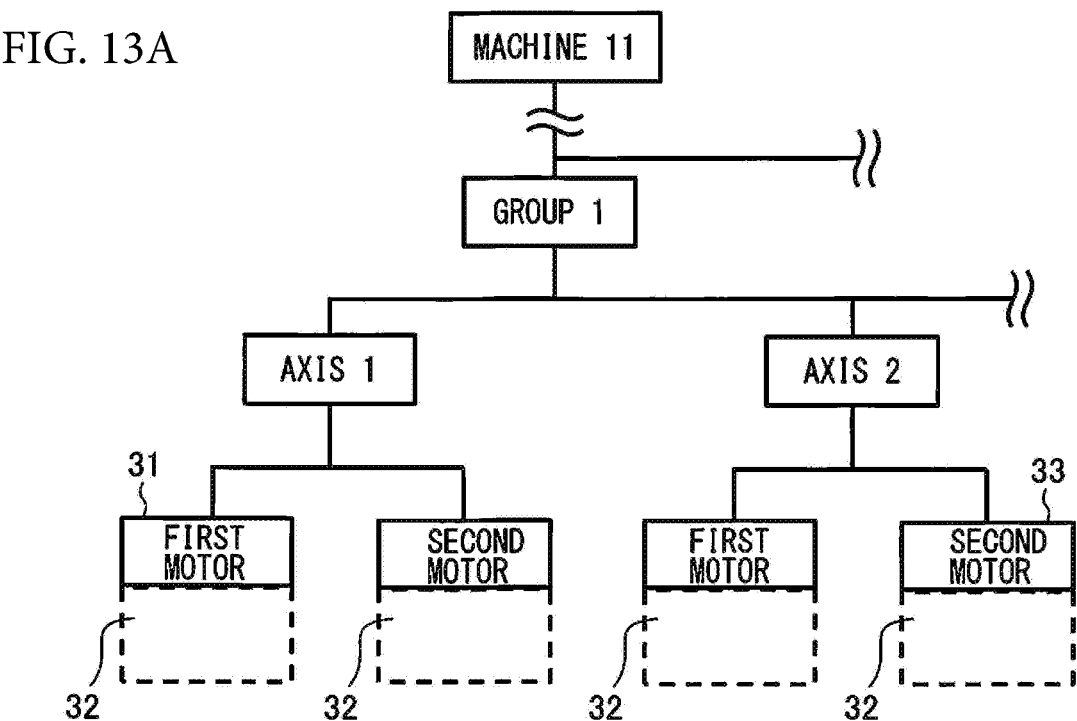
FIGS. 13A and 13B are drawings that schematically show the operation described with reference to FIG. 12.
Figure 13B:
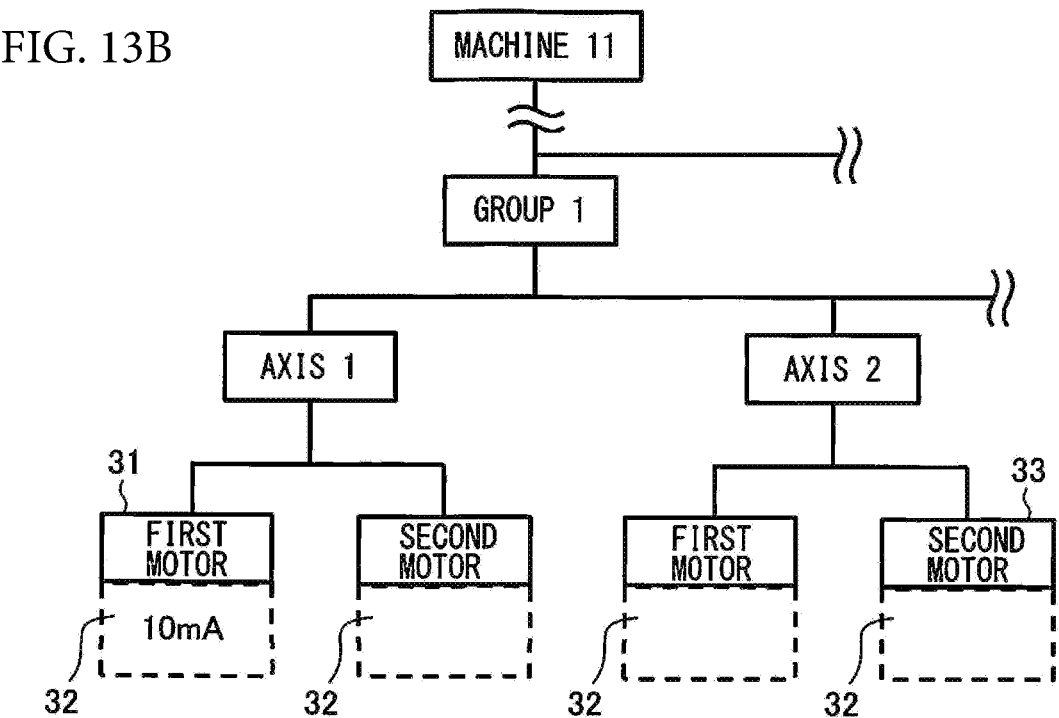

For example, in the data model 28 of FIGS. 11A to 11C, various types of information about a present position, a current value, a torque, and the like can be assigned to a distal node 31 corresponding to a first motor of an axis 1 in a group 1 (refer to blanks (blank portions) indicated by reference numeral 32 of FIG. 13). As a matter of course, various types of information can be assigned to other nodes (internal nodes or leaf nodes).

The data model 28 may also have another structure, as long as the data model 28 is constituted of nodes corresponding to as least physical elements or management elements. In other words, the data model 28 is not necessarily constituted of only the nodes corresponding to the physical elements and the management elements, as shown in FIGS. 11A to 11C, but, for example, may be constituted of only nodes corresponding to the physical elements or only nodes corresponding to the management elements. The data model 28 may appropriately include a node corresponding to a different element from the physical elements or the management elements, a blank node corresponding to no element, or the like.

Figure 12:
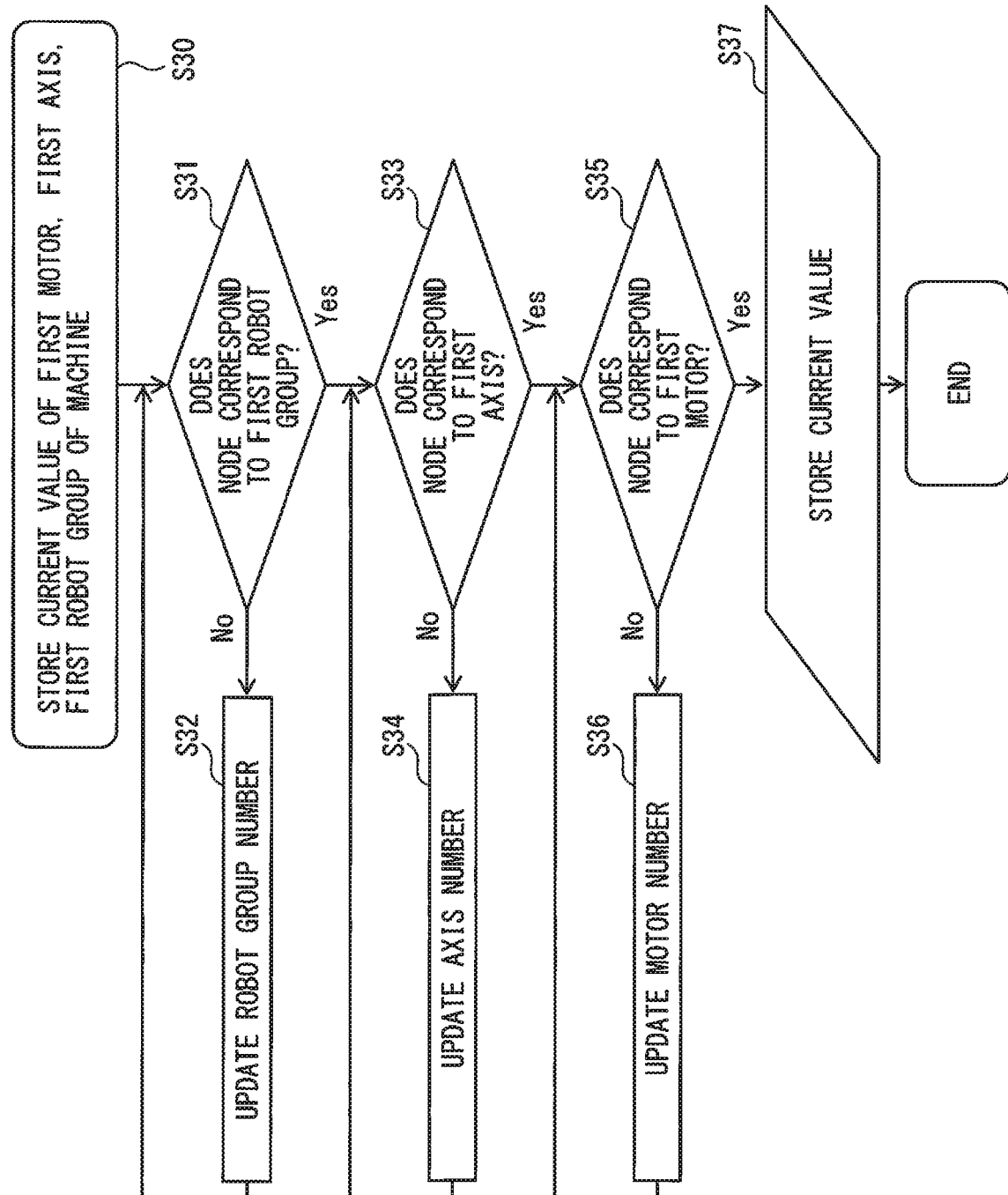
FIG. 12 is a flowchart that explains an example of an operation for generating second machine information based on the data model shown in FIGS. 11A to 11C.

FIG. 12 is a flowchart that explains an example of an operation for generating second machine information based on the data model of FIGS. 11A to 11C.

Before the operation flow of FIG. 12 is started, it is assumed that the management computer 25 as shown in FIG. 5 or 6 has received a current value of a first motor of an axis 1 in a group 1 of the machine 12 (robot), as first machine information. Thus, the information conversion unit 23 of the base software application 13 commands the CPU 30 to store the current value of the first motor of the axis 1 in the group 1, based on the data model 28 (FIGS. 11A to 11C) (step S30).

Then, in step S31, the CPU 30 searches the data model 28 stored in the memory unit 17 (see FIGS. 11A to 11C) for a node corresponding to the group 1 (first robot group). In other words, the CPU 30 sequentially determines whether or not each node constituting the data model 28 is a node corresponding to the group 1 (first robot group). The determination is repeated until the node corresponding to the group 1 is found (steps S31 to S32).

When the node of the group 1 is identified in step S31, in the next step S33, the CPU 30 searches the data model 28 (see FIGS. 11A to 11C) for a node corresponding to the axis 1 of the group 1. The CPU 30 sequentially determines whether or not each of nodes corresponding to the group 1 is a node corresponding to the axis 1 (first axis). The determination is repeated until the node corresponding to the axis 1 is found (steps S33 to S34).

When the node of the axis 1 of the group 1 is identified in step S33, in the next step S35, the CPU 30 searches the data model 28 (see FIGS. 11A to 11C) for a node corresponding to the first motor of the axis 1 of the group 1. The CPU 30 sequentially determines whether or not each of nodes corresponding to the axis 1 of the group 1 is a node corresponding to the first motor. The determination is repeated until the node corresponding to the first motor is found (steps S35 to S36).

According to steps S31 to S36, the CPU 30 can identify the node corresponding to the first motor of the axis 1 of the group 1 in the data model 28 (see FIGS. 11A to 11C). Subsequently, the CPU 30 stores data of the current value in a blank (indicated by reference numeral 32 of FIG. 13) belonging to the identified node (step S37).

FIG. 13 is a drawing that schematically shows the state of the above operation. FIG. 13 is a drawing excerpted in part from the data model for robots shown in FIGS. 11A to 11C. FIG. 13 schematically shows the states before and after storing the information about the current value of the first motor of the axis 1 of the group 1 of the robot, as described above.

Before the information (first machine information) about the current value of the first motor of the axis 1 in the group 1 of the robot is inputted to the management computer 25, as shown in FIG. 13 (A), no data is stored in a blank 32 belonging to a node 31 corresponding to the first motor of the axis 1. No data is stored in any blank 32 of any node.

When the information about the current value is inputted to the management computer 25, the information about the current value (e.g. 10 mA) is stored in the blank 32 by steps S31 to S36 (see FIG. 13 (B)).

Since the above is just an example, if information about a current value of a second motor of an axis 2 in the group 1 of the robot is inputted to the management computer 25, the information about the current value is stored in a blank 32 belonging to a node 33 corresponding to the second motor of the axis 2 in the group 1.

As described above, the data structure of the information (in other words, second machine information) generated based on the data model of FIGS. 11A to 11C is substantially the same as the data structure of the data model of FIGS. 11A to 11C, when viewed from the side of the operation software application 14, except that information is stored in some blank 32 and not stored in the other blanks 32. In other words, the second machine information has a definite format data structure on which the operation software application 14 can easily perform analysis, tabulation, and the like.

Figure 14:
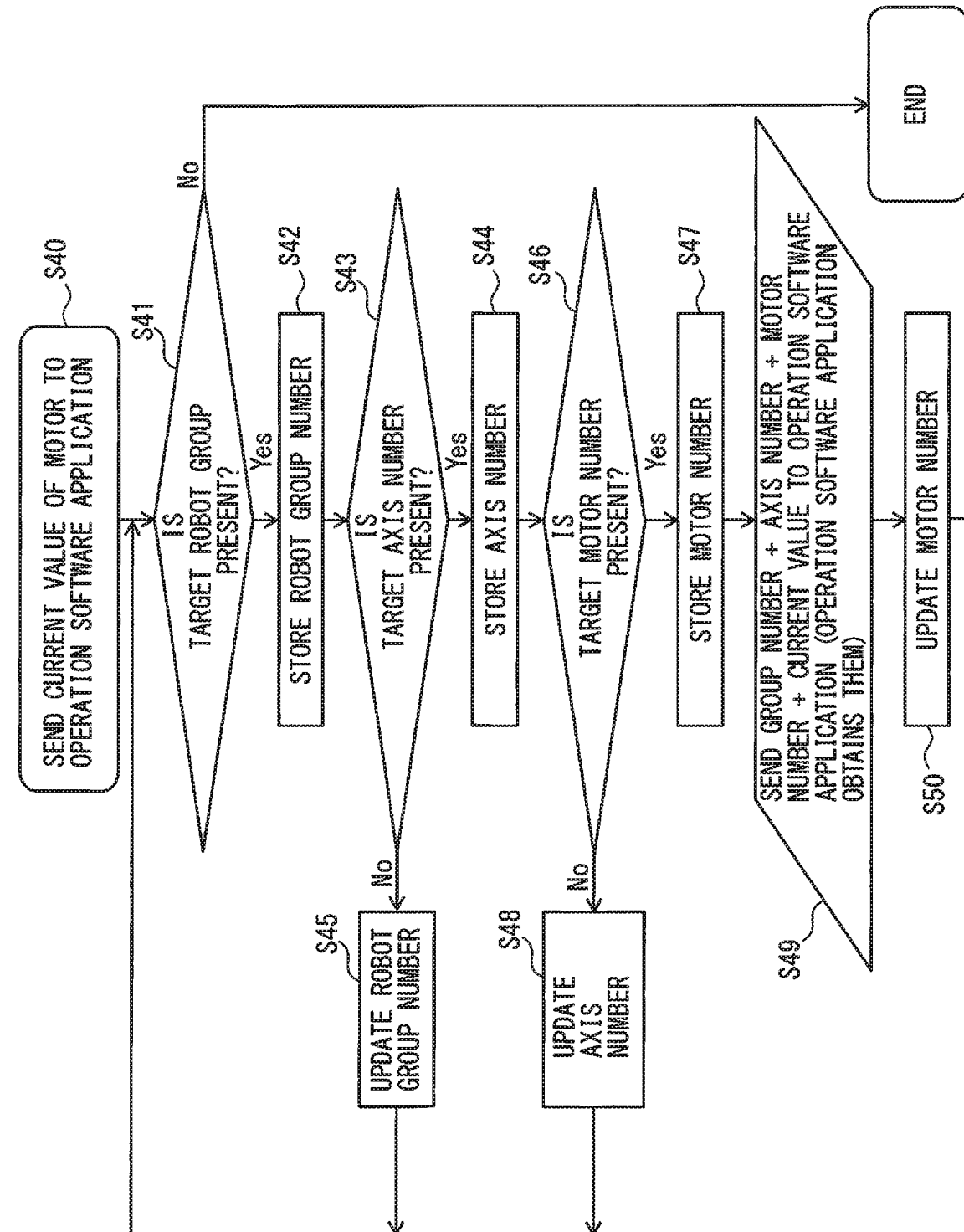
FIG. 14 is a flowchart of an example of an information conversion operation when information about a motor current value is transmitted to an operation software application.

The operation of converting first machine information into second machine information, based on the data model, will be described. As a representative example, an information conversion operation, when information about a current value of a motor outputted from the machine 12, i.e., a robot, is transmitted to the operation software application 14, will be described. FIG. 14 is a flowchart of an example of the information conversion operation according to the representative example.

Before the operation flow of FIG. 14 is started, it is assumed that information (first machine information) about a current value of a first motor of an axis 1 in a group 1 of a robot is inputted to the management computer 25 as shown in FIG. 5 or 6. At this time, as shown in FIG. 13 (B), the information about the current value is stored in a blank 32 belonging to a node 31 corresponding to the first motor of the axis 1 in the group 1 of the robot. The base software application 13 commands the CPU 30 to convert the information about the current value of the motor stored in the blank 32 into second machine information, and to transmit the second machine information to the operation software application 14 (step S40).

Then in step S41, the CPU 30 determines whether or not a robot group number that targets the information of the current value of the first motor of the axis 1 of the group 1 is present in the data model 28 (see FIGS. 11A to 11C) stored in the memory unit 17. When the robot group number is determined to be present, the CPU 30 stores the robot group number (group 1 in this example) in the memory unit 17 (step S42). When the robot group number is determined to be absent in step S41, the CPU 30 ends the process of step S40.

Then, in step S43, whether or not an axis number that targets the information of the current value of the first motor of the axis 1 of the group 1 is present in the data model 28 (see FIGS. 11A to 11C) stored in the memory unit 17 is determined. When the axis number is determined to be present, the CPU 30 stores the axis number (axis 1 in this example) in the memory unit 17 (step S44). When the axis number is determined to be absent in step S43, the CPU 30 updates the robot group number (step S45), and performs the determination of step S41 again.

Then, in step S46, whether or not a motor number that targets the information of the current value of the first motor of the axis 1 of the group 1 is present in the data model 28 (see FIGS. 11A to 11C) stored in the memory unit 17 is determined. When the motor number is determined to be present, the CPU 30 stores the motor number (1 in this example) in the memory unit 17 (step S47). When the motor number is determined to be absent in step S46, the CPU 30 updates the axis number (step S48), and performs the determination of step S41 again.

In the next step S49, the CPU 30 compiles the robot group number obtained in step S42, the axis number obtained in step S44, the motor number obtained in step S47, and the current value into a series of information, and transmits the information to the operation software application 14. For example, the CPU 30 transmits a data series of "robot group 1/axis 1/first motor/current value" to the operation software application 14.

Then, in step S50, the CPU 30 updates the motor number (step S50), and performs the determination of step S41 again.

According to steps S41 to S50, as described above, the CPU 30 can convert the first machine information, e.g. the first current value of the first motor of the axis 1 in the group 1 of the robot, into the second machine information containing information about a machine structure component from which the current value derives, based on the data model 28 (data model for robots shown in FIGS. 11A to 11C), and transmit the second machine information to the operation software application 14. Therefore, the processing speed (for example, the speed of analysis, tabulation, and the like) of the operation software application 14 can be improved.

FIG. 15 is a drawing of another example of the data model for NC machine tools. FIGS. 16A and 16B is a drawing of another example of the data model for robots. The data model shown in FIG. 15 may be used instead of the data model for NC machine tools shown in FIGS. 4A to 4C. The data model shown in FIGS. 16A and 16B may be used instead of the data model for robots shown in FIGS. 11A to 11C.

Figure 15A:
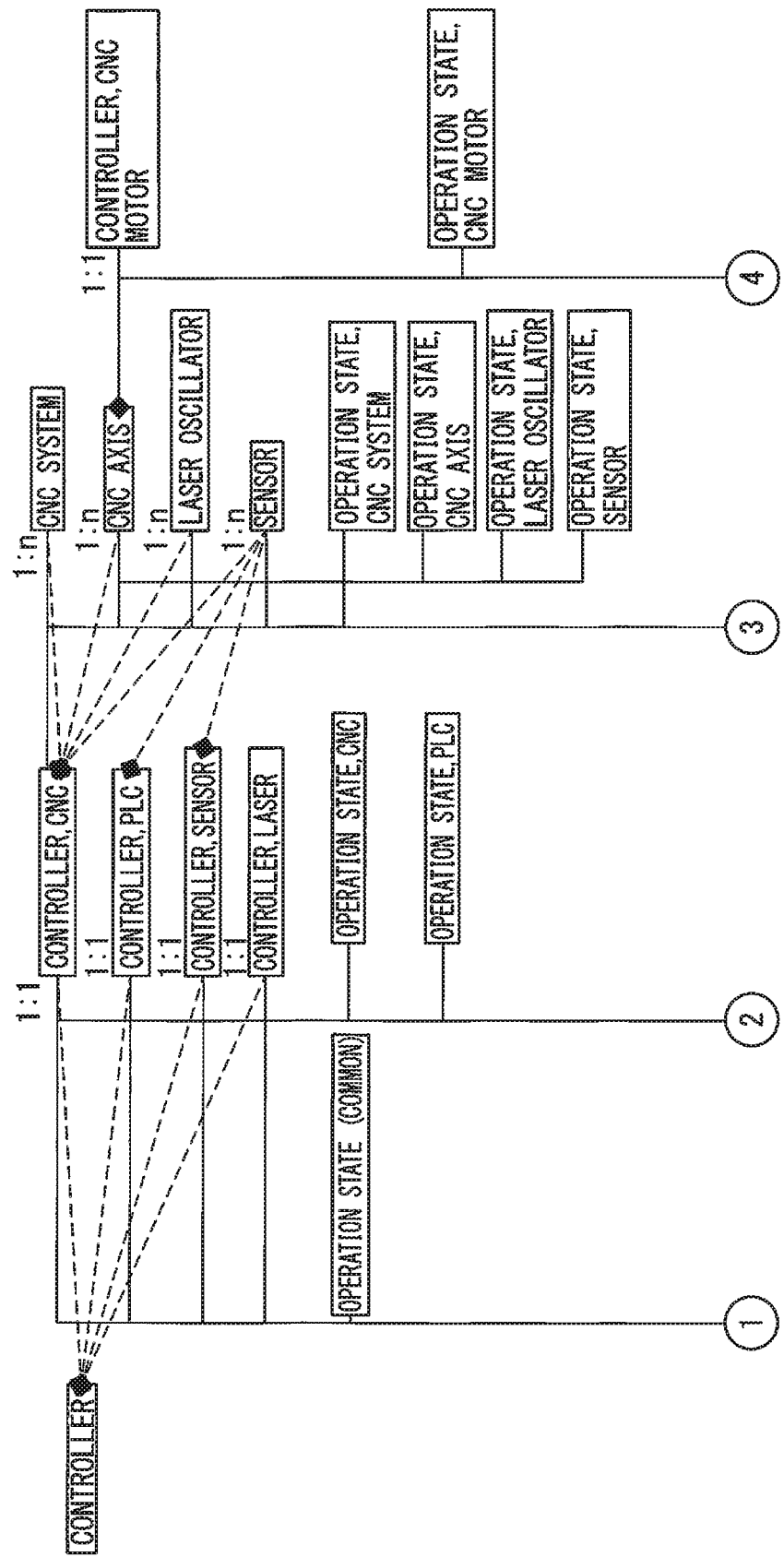
FIGS. 15A and 15B are drawings of another example of the data model for NC machine tools.
Figure 15B:
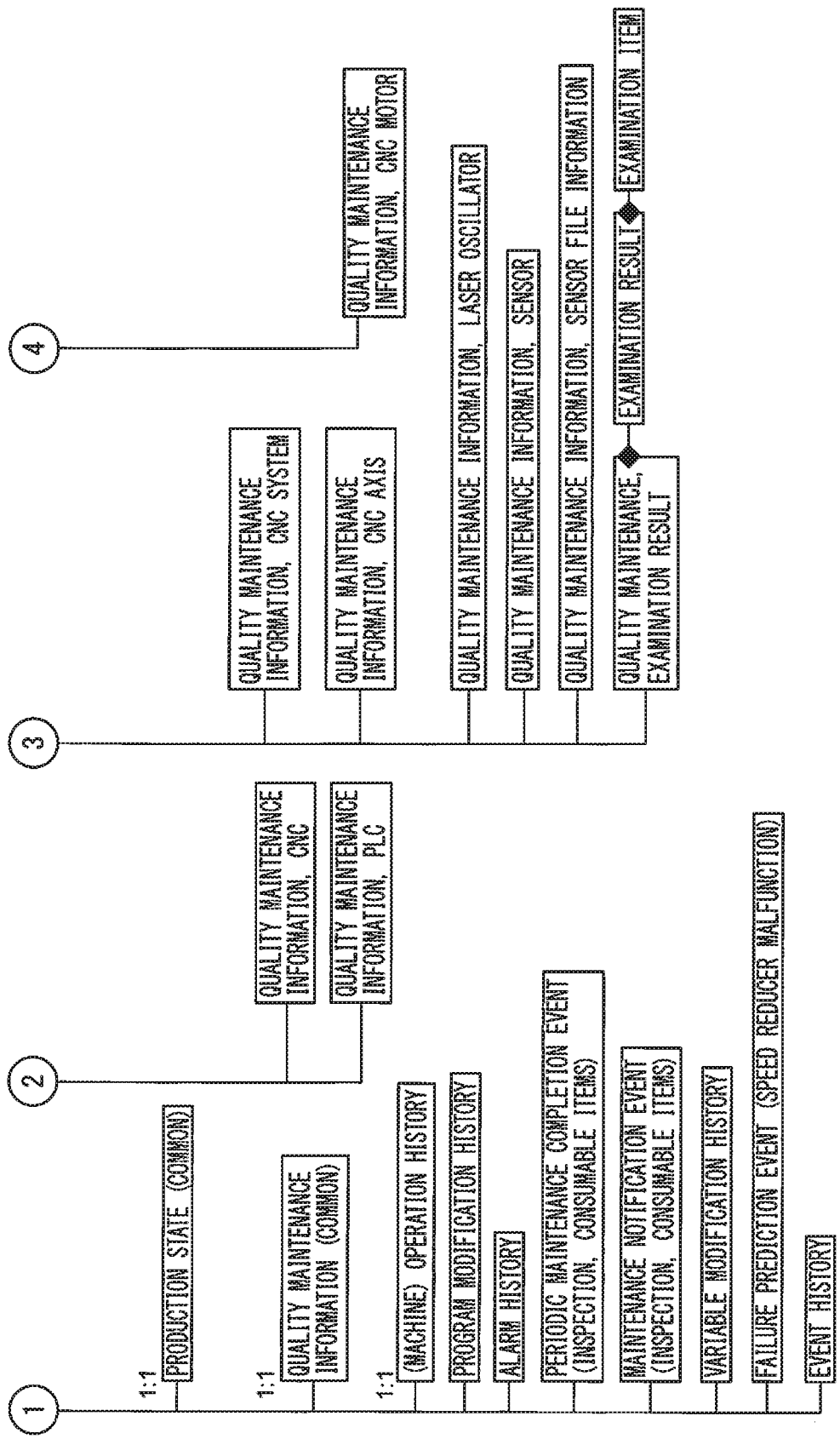
Figure 16A:
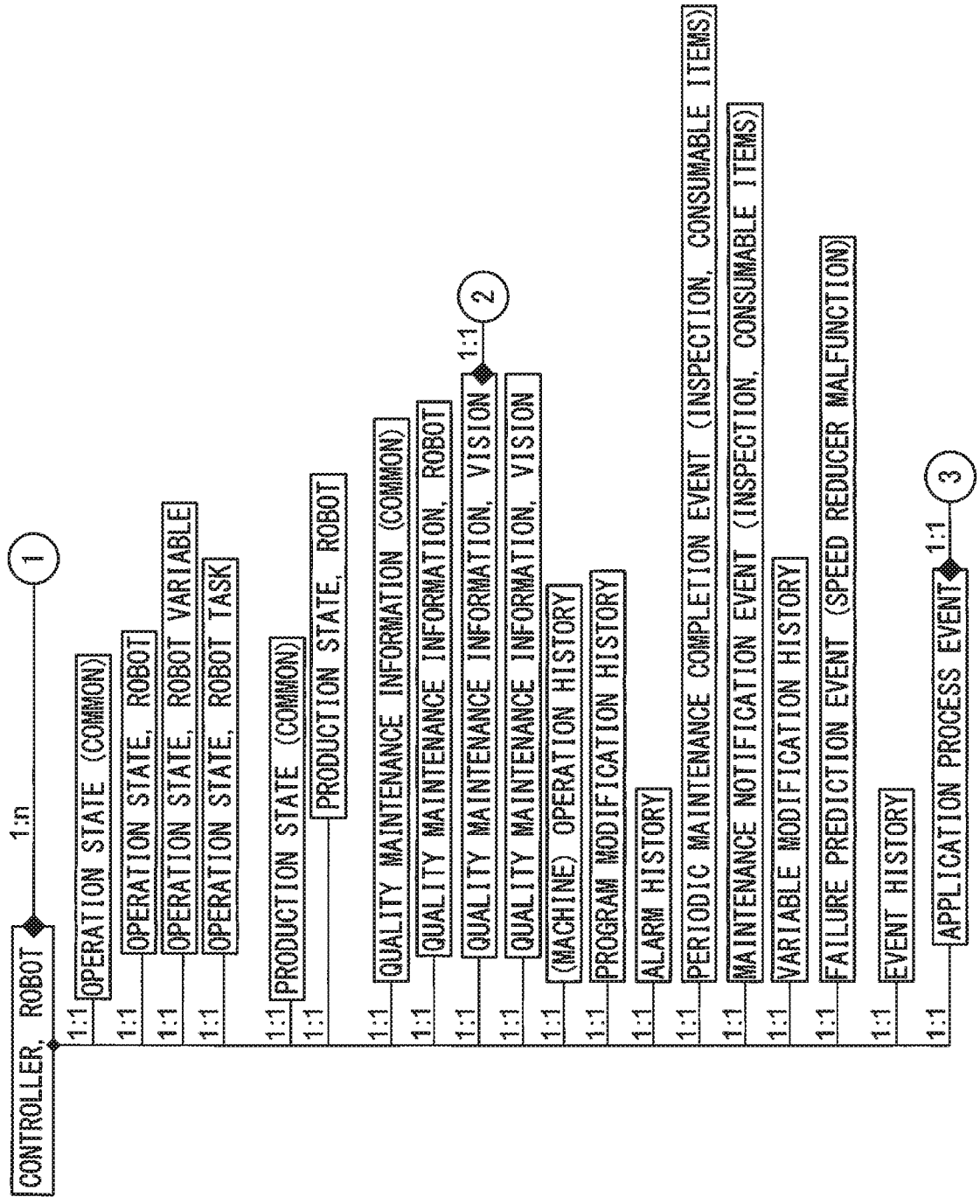
FIGS. 16A and 16B are drawings of another example of the data model for robots.
Figure 16B:
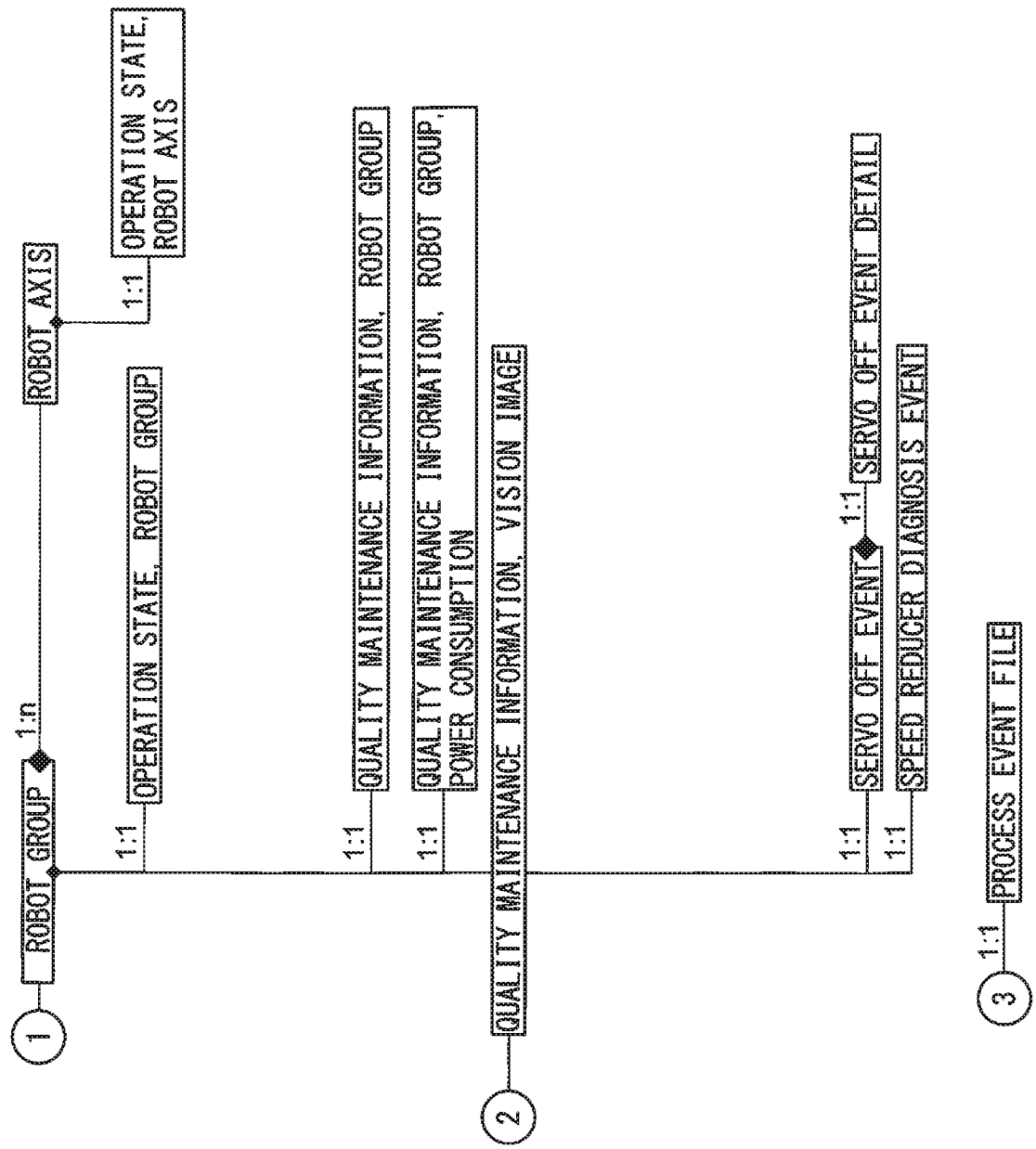

For example, in the data model for NC machine tools shown in FIGS. 15A and 15B, nodes indicated with a controller for NC machine tools, a controller PLC, a controller sensor, a controller laser, a CNC axis, a controller CNC motor, a laser oscillator, a sensor, and the like are nodes of individual physical elements constituting the NC machine tools. The other nodes are nodes corresponding to various management elements to be managed by the NC machine tools (for example, an operation state, a production state, quality maintenance information, an operation history, and the like). In each drawing, a notation of "1:1" denotes that a parent node and a child node are present at a ratio of 1:1. A notation of "1:n" denotes that a plurality of child nodes are present with respect to one parent node. In FIGS. 15A and 15B, dotted lines indicate that structure components are present in the physical components corresponding to parent nodes.

In the data model according to this embodiment, as shown in the data structure shown in FIGS. 15 and 16, nodes corresponding to individual physical elements constituting machines may be arranged in one of a column direction and a row direction (column direction in the drawings), nodes corresponding to various management elements of the machines may be arranged in the other of the column direction and the row direction (row direction in the drawings). In the data models of FIGS. 15 and 16, blanks 32 are present in certain nodes, as described with reference to FIG. 13.

In the machine system 10 according to this embodiment, the machines 11 and 12 and the like are installed in, for example, a plant for manufacturing products. On the other hand, the base software application 13 is installed in the management computer 25 disposed in, for example, another building in the site of the plant having the machines 11 and 12 and the like. In this case, the management computer 25 is preferably connected to each of the machines 11 and 12 and the like so as to establish intercommunication therewith over an intranet e.g. a fieldbus network. The management computer 25 is a machine control computer. Furthermore, the management computer 25 is preferably connected to a host computer 24 (refer to FIG. 2) disposed in e.g. an office in a remote location from the plant, so as to establish intercommunication therewith over the Internet. The host computer 24 is, for example, a manufacturing execution system (MES) that makes a production plan for the machines 11 and 12 and the like and manages a production state in the office.

The base software application 13 and the operation software application 14 are preferably installed in the management computer 25 from computer-readable portable recording mediums using well-known setup programs or the like. The portable recording medium is, for example, a CD-ROM (compact disk read only memory), a DVD-ROM (digital versatile disk read only memory), or the like. When the base software application 13 and the operation software application 14 are each recorded in the recording mediums, the management computer 25 preferably includes drives for the recording mediums. The base software application 13 and the operation software application 14 may be downloaded from another computer connected to the management computer 25 through the Internet, Ethernet (trademark), or the like.

The base software application 13 according to this embodiment can be a base i.e., a software platform for running not only a single operation software application 14 but a plurality of operation software applications 14 for performing different types of processing. In this case, each operation software application 14 preferably includes in advance identification information assigned to a machine to which information processing is to be performed, and each operation software application 14 is preferably programmed so as to obtain second machine information based on the identification information of the machine. Thus, even when the plurality of operation software applications 14 are installed in the management computer 25, the management computer 25 can recognize that the second machine information belongs to which machine processed by which operation software application 14, from the identification information of the machine associated with the second machine information.

The base software application 13 does not include only the first communication unit 15, the second communication unit 16, the information conversion unit 23 described above. The base software application 13 preferably includes various types of other program portions such as a determination unit, a third communication unit 20, a fourth communication unit 22, a billing processing unit, and a version management unit to be executed by the CPU of the management computer 25.

To be more specific, in the machine system 10 according to this embodiment, the base software application 13 preferably further includes a determination unit (not shown) that is a program portion to enable the CPU of the management computer 25 to determine whether the operation software application 14 is appropriate or inappropriate. When the determination unit determines that the operation software application 14 is inappropriate, the CPU of the management computer 25 is preferably disabled from executing the second communication unit 16. In this case, the operation software application 14 preferably includes certification record information 18, which is based on information about a maker of the operation software application 14 and an examination result of the operation software application 14. For example, the maker of the operation software application 14 actually installs a generated operation software application 14 in a computer system identical to the management computer 25, and approves the operation software application 14 as a safe product, when an examination result is favorable. The maker records information about the approval on the operation software application 14 together with the maker information. The information recorded at this time may be the certification record information 18 described above. Note that, a maker of the base software application 13 or the like may give the approval based on an examination result by the maker of the operation software application 14.

In this configuration, a part of first command information to be inputted from the operation software application 14 to the base software application 13 is the certification record information 18. When the determination unit determines that the certification record information 18 is inappropriate, for example, when the maker is unidentified or there is no information about approval, the base software application 13 preferably disables the CPU of the management computer 25 from executing the second communication unit 16. Thus, when the operation software application 14 is inappropriate, a communication control unit (not shown), which is a hardware interface of the management computer 25, can be disabled from functioning. In other words, when the operation software application 14 is unapproved, the base software application 13 does not transmit and receive machine information and command information between the operation software application 14 and the base software application 13.

Also, at least any one of the base software application 13 and the operation software application 14 preferably further includes a billing processing unit that is a program portion to enable the CPU of the management computer 25 to execute billing processing based on usage of at least any one of the base software application 13 and the operation software application 14 to charge a user for a usage fee. The billing processing unit preferably enables the CPU of the management computer 25 to determine whether or not the usage fee for at least any one of the base software application 13 and the operation software application 14 has been paid.

The billing processing unit is preferably a program portion to enable the CPU of the management computer 25 to monitor the duration of use of at least any one of the base software application 13 and the operation software application 14 from a starting point, and to generate fee payment information and output the fee payment information to the first communication unit 15 at established intervals. The fee payment information is information required by the CPU of the management computer 25 to determine whether or not a usage fee for at least any one of the base software application 13 and the operation software application 14 has been paid. For example, the fee payment information is information to let a user input a payment certification code that is obtained in exchange for payment of the usage fee to a maker of the management computer 25, a collecting agent commissioned by the maker, a collecting machine of the collecting agent, or the like, a credit card number of a credit card company designated by the maker, or the like.

According to this configuration, for example, the first communication unit 15 can enable the CPU of the management computer 25 to control the transmission and reception of information to and from each of the machines 11 and 12 and the like based on the fee payment information on the base software application 13 or the operation software application 14. For example, when the payment certification code, which can determine the presence or absence of payment, or the like is not inputted to the management computer 25, the management computer 25 stops or decelerates communication with each of the machines 11 and 12 and the like.

Furthermore, as shown in FIG. 1, the base software application 13 preferably further includes a third communication unit 20 that is a program portion to enable the management computer 25 to communicate with an external device such as a monitor 19. In this configuration, the above billing processing unit is preferably a program portion that enables the CPU of the management computer 25 to monitor the duration of use of at least any one of the base software application 13 and the operation software application 14 from a starting point, and to generate fee payment information and output the fee payment information to the first communication unit 15 at established intervals.

According to this configuration, for example, the third communication unit 20 can enable the CPU of the management computer 25 to display a warning message about the absence of payment on the monitor 19, based on the fee payment information on the base software application 13 or the operation software application 14. For example, when a payment certification code, which determines the presence or absence of payment, or the like is not inputted to the management computer 25, the management computer 25 displays a message indicating that payment cannot be ascertained, on the monitor 19.

The starting point of the monitoring is, for example, the timing of installing at least any one of the base software application 13 and the operation software application 14. The starting point may be the date of purchase of at least any one of the base software application 13 and the operation software application 14.

The above billing processing unit enables the management computer 25 to charge a usage fee in accordance with the duration of use of at least any one of the base software application 13 and the operation software application 14 from a starting point, but the present invention is not limited thereto.

For example, the billing processing unit may enable the management computer 25 not to charge a usage fee, when the duration of use of at least any one of the base software application 13 and the operation software application 14 from a starting point is within a certain time period.

The billing processing unit may enable the management computer 25 to determine the duration of use of at least any one of the base software application 13 and the operation software application 14 in accordance with a fixed fee payment status of at least any one of the base software application 13 and the operation software application 14. For example, a fixed usage fee e.g. a monthly fee or an annual fee for the base software application 13 is set. When the execution of the base software application 13 and the operation software application 14 is started, if information to determine the presence or absence of payment of the fixed usage fee for the base software application 13 e.g. a payment certification code has already been inputted to the management computer 25, the management computer 25 permits communication with the machines 11 and 12 and the like for an indefinite or definite duration.

The billing processing unit may monitor a communication traffic volume on at least any one of the base software application 13 and the operation software application 14, and enable the management computer 25 to execute the billing processing in accordance with the communication traffic volume. In this case, the management computer 25 obtains a communication traffic volume of at least any one of the first machine information and the second command information communicated with the machines 11 and 12 and the like, and calculates a fee based on the communication traffic volume, to control communication with the machines 11 and 12 and the like in accordance with the payment status of the fee.

The billing processing unit may monitor at least any one of an information throughput when processing first machine information outputted from each of the machines 11 and 12 by the base software application 13 and an information throughput when processing second machine information outputted from the base software application 13 by the operation software application 14, and may enable the management computer 25 to execute the billing processing in accordance with the information throughput.

The billing processing unit may count the number of executions of at least any one of the base software application 13 and the operation software application 14, and enable the management computer 25 to execute the billing processing in accordance with the number of executions.

The billing processing unit may recognize the number of machines connected to the management computer 25, and enable the management computer 25 to execute the billing processing in accordance with the recognized number of machines. In this case, the number of connected machines may be recognized by energization states of connection terminals of the management computer 25 provided for connection with the machines 11 and 12 and the like.

The billing processing unit may recognize the number of people registered as users with the management computer 25, and enable the management computer 25 to execute the billing processing in accordance with the recognized number of users. In this case, the management computer 25 may recognize the number of users of the management computer 25 based on user names and passwords inputted to a login screen.

In the above machine system 10, the base software application 13 preferably further includes a version management unit that is a program portion to enable the CPU of the management computer 25 to manage the version (version number) of at least any one of the base software application 13 and the operation software application 14. In this case, as shown in FIG. 1, the machine system 10 preferably further includes a memory unit 21 that stores the latest version number of at least any one of the base software application 13 and the operation software application 14. In this configuration, the base software application 13 preferably further includes a fourth communication unit 22 that is a program portion to enable the CPU of the management computer 25 to check the contents of the memory unit 21 by mutual communication with the memory unit 21. When the latest version number of at least any one of the base software application 13 and the operation software application 14 stored in the memory unit 21 is later or greater than the current version number of the software (13 or 14), the version management unit preferably enables the CPU of the management computer 25 to output the latest version number to the first communication unit 15 or the third communication unit 20.

Furthermore, at least any one of the base software application 13 and the operation software application 14 preferably further includes a program portion that enables the CPU of the management computer 25 to execute license authentication of at least any one of the base software application 13 and the operation software application 14. For example, after the base software application 13 or the operation software application 14 is installed in the management computer 25, the management computer 25 displays information that requires a user to input a software-specific ID, e.g. a product key or a digital certificate, to the management computer 25 on the monitor 19, before reaching a certain period of time or a certain running number predetermined for each application. The product key or the digital certificate is preferably issued in exchange for fee payment for the base software application 13 or the operation software application 14. The management computer 25 checks the software-specific ID inputted by the user in accordance with the displayed information, and only when an agreement on license provisions is verified, the management computer 25 determines that license authentication is completed. While the license authentication is not completed, the functions of the base software application 13 or the operation software application 14 are stopped or limited. When a plurality of licenses are provided for each of the base software application 13 and the operation software application 14, the number of installations or executions of each software application is counted. When the number exceeds a given license number, the functions of the operation software application 13 or the operation software application 14 are preferably stopped or limited.

At least any one of the base software application 13 and the operation software application 14 preferably further includes a copy protection function. For example, when the base software application 13 or the operation software application 14 is copied to a computer other than the management computer 25, the copied base software application 13 or operation software application 14 is preferably encoded so that the computer cannot execute the copied base software application 13 or operation software application 14 without a decode key. The base software application 13 or the operation software application 14 may have the function of limiting the number of copies. Otherwise, the base software application 13 and the operation software application 14 themselves may determine whether or not the base software application 13 or the operation software application 14 is stored in the management computer 25, and when none of the software applications is stored in the management computer 25, the base software application 13 and the operation software application 14 disable execution.

At least any one of the base software application 13 and the operation software application 14 preferably includes a program portion that enables the CPU of the management computer 25 to add advertisement information to information outputted to the external device 19 through the third communication unit 20. This allows the maker of the management computer 25 to advertise the maker's products to a user of the management computer 25.

At least any one of the base software application 13 and the operation software application 14 further includes a program portion that enables the CPU of the management computer 25 to provide personal assistance. As an example of the personal assistance, when a user desires to collect required machine information from the machine 11 to the management computer 25, only the required information is preferably collected and outputted from the management computer 25, upon the user's request to the management computer 25 for the required information, out of information from the machines 11 and 12 and the like. As the function of the personal assistance, when a person speaks to a microphone connected to the management computer 25, the management computer 25 may understand spoken words and answer the words by sound, text, or the like.

The base software application 13 preferably includes a program portion that enables the CPU of the management computer 25 to authenticate devices, e.g. the machine 11, the machine 12, the peripheral device 26, and the like, connected to the management computer 25. For example, the management computer 25 can detect the connection of the devices by energization states of communication connection terminals, which are connected to the devices in a communicatable manner. In response to the detection of the connection, the management computer 25 receives specific identification information e.g. MAC addresses (media access control addresses) from the devices, and determines whether or not the received MAC addresses have already been registered with the management computer 25. When the received MAC addresses have been registered with the management computer 25, the management computer 25 allows communication with the connected devices, e.g. the machines 11 and 12 and the like.

The machine system 10 preferably includes the host computer 24 connected to the management computer 25 through the Internet (see FIG. 2). In this case, the second communication unit 16 of the base software application 13 preferably enables the CPU of the management computer 25 to upload first machine information, second machine information, or information related to the first machine information or the second machine information to the host computer 24 in response to a command from the host computer 24. In addition, the second communication unit 16 preferably enables the CPU of the management computer 25 to download data or a program from the host computer 24 to the management computer 25 in response to a command from the host computer 24.

A machine learning software application is preferably installed in the management computer 25 in order to enable the CPU of the management computer 25 to execute machine learning based on second machine information. The machine learning includes deep learning, reinforcement learning, and the like. The second machine information is definite format information (structured data) as described above, and hence is easy to handle in the machine learning.

In this case, the second communication unit 16 of the base software application 13 preferably enables the CPU of the management computer 25 to upload data after the execution of the machine learning, e.g. a learned model to the host computer 24, in response to a command from the host computer 24. In addition, the second communication unit 16 preferably enables the CPU of the management computer 25 to download data or a program for the machine learning corrected or generated by the host computer 24 to the management computer 25, in response to a command from the host computer 24.

Concrete examples of first machine information and second command information to be transmitted and received between the management computer 25 and each of the machines 11 and 12 and the like, and second machine information and first command information to be transmitted and received between the base software application 13 and the operation software application 14 will be described below.

A part of the first machine information and the second machine information are, for example, information about at least any one of operating times of the machines 11 and 12 and the like, and the current value, vibration value, generated temperature, and sound volume of a motor. A part of the first command information and the second command information are information about at least any one of a stop command and a deceleration command for the machines 11 and 12 and the like and a warning display. By transmitting and receiving the information to and from the base software application 13, the base software application 13 can detect a malfunction of each of the machines 11 and 12.

The first machine information may include position information on the machines 11 and 12 and the like, for example, the position of a distal end portion of a robot arm or the like. In this case, a part of the second command information is preferably operation command information for the machines 11 and 12 and the like in order to prevent interference between the machines, when the relative position between the machines 11 and 12 is within a certain distance, by issuing a stop command to the machine having a lower priority. By transmitting and receiving the information to and from the base software application 13, the base software application 13 can prevent the interference between the machines 11 and 12.

The first machine information may include operation reception information and operation completion information on the machines 11 and 12 and the like. In this case, a part of the second command information is preferably operation command information including at least any one of a choice of contents, an operation sequence, actuations of the machines 11 and 12 and the like, and stops of the machines 11 and 12 and the like as to operations stored in advance in the machines 11 and 12 and the like. By transmitting and receiving the information to and from the base software application 13, the base software application 13 can manage the operation state of each of the machines 11 and 12.

The first machine information may include information about the states of objects to be operated by the machines 11 and 12 and the like. In this case, a part of the second command information is preferably operation change command information to change the operation of the machines 11 and 12 and the like in accordance with the states of the objects to be operated. By transmitting and receiving the information to and from the base software application 13, the base software application 13 can correct, complement, or examine the operation of each of the machines 11 and 12 in accordance with the state of the object to be operated by each of the machines 11 and 12.

The first machine information may include scheduled operation information on the machines 11 and 12 and the like. In this case, a part of the second command information is preferably a determination result of whether the scheduled operation of the machines 11 and 12 and the like is appropriate or inappropriate. By transmitting and receiving the information to and from the base software application 13, the base software application 13 can check a simulation result of the operations of the machines 11 and 12 and the like.

Note that, each of the machines 11 and 12 is not limited to a machine tool or an industrial robot, but may be a PLC (programmable logic controller), a carrier, a measuring instrument, a tester, a pressing machine, a press fitting machine, a printer, a die cast machine, an injection molding machine, a food machine, a packaging machine, a welder, a washer, a coating machine, an assembling machine, a mounting machine, a wood working machine, a sealing machine, a cutter, or the like.

Each of the memory units 17 and 21 is, for example, a memory device such as a RAM (random access memory), a fixed disk drive such as a hard disk, a magnetic tape drive, a magnetic disk drive, an optical disk drive, or the like.

As described above, according to the machine system 10 of this embodiment, the transmission and reception of information among the base software application 13, the operation software application 14, and each of the machines 11 and 12 allows storing and managing the information at the time of the transmission and reception, while performing the operation of each machine. For example, the transmission and reception of the information may be limited based on the certification record information included in the operation software application 14. The fee payment information on the operation software application 14 or the base software application 13 may be outputted to the first communication unit 15 or the third communication unit 20.

The present invention is described above using the typical embodiment, but those skilled in the art can recognize that the above embodiment can be variously modified, omitted, or added without departing from the scope of the present invention.

What is claimed is:

1. A machine control computer communicatably connected to a machine, comprising a base software application and an operation software application installed in at least one memory in the computer, wherein
    the base software application, when executed by the computer, is configured to:
        enable a CPU of the computer to receive first machine information, which is specific to the machine, outputted from the machine;
        enable the CPU of the computer to transmit second machine information specific to the operation software application to the operation software application; and
        enable the CPU of the computer to convert the first machine information into the second machine information, based on a data model corresponding to a category of the machine,
    wherein
    the operation software application, when executed by the computer, is configured to use the second machine information as input information to control the machine,
    the data model has a tree-type data structure in which both (1) each individual physical element constituting the machine and (2) various management elements of the machine are indicated by a node, and the first machine information is assigned to the node corresponding to (1) the individual physical element and (2) the various management elements,
    the machine includes a plurality of physical axes and a plurality of motors each being associated with a corresponding one of the plurality of physical axes, and
    the each individual physical element indicated by the node in the tree-type data structure includes a corresponding one of the plurality of physical axes.

2. The computer according to claim 1, wherein the data model is sharable between a plurality of the machines belonging to the same category.

3. The computer according to claim 1, wherein the second machine information converted includes at least the first machine information, and identification information of the node corresponding to the individual physical element or the various management elements from which the first machine information derives.

4. The computer according to claim 1, wherein at least any one of the base software application and the operation software application; when executed by the computer, is further configured to enable the CPU of the computer to charge a fee based on usage of at least any one of the base software application and the operation software application.

5. The computer according to claim 4, wherein the base software application, when executed by the computer, is further configured to enable the CPU of the computer to monitor a duration of use of at least any one of the base software application and the operation software application from a starting point, and, at established intervals, generate information about payment of the fee and output the information.

6. The computer according to claim 4, wherein
    the base software application, when executed by the computer, is further configured to enable the CPU of the computer to communicate with an external device, and
    the base software application, when executed by the computer, is further configured to enable the CPU of the computer to monitor a duration of use of at least any one of the base software application and the operation software application from a starting point, and, at established intervals, generate information about payment of the fee and output the information to the external device.

7. The computer according to claim 5, wherein the starting point is the timing of installing at least any one of the base software application and the operation software application.

8. The computer according to claim 5, wherein the starting point is the date of purchase of at least any one of the base software application and the operation software application.

9. The computer according to claim 4, wherein the at least any one of the base software application and the operation software application, when executed by the computer, is further configured to enable the CPU of the computer to charge the fee in accordance with a communication traffic volume on at least any one of the base software application and the operation software application.

10. The computer according to claim 4, wherein the at least any one of the base software application and the operation software application, when executed by the computer, is further configured to enable the CPU of the computer to charge the fee in accordance with the number of executions of at least any one of the base software application and the operation software application.

11. The computer according to claim 4, wherein the at least any one of the base software application and the operation software application, when executed by the computer, is further configured to enable the CPU of the computer to charge the fee in accordance with the number of the machines connected to the computer.

12. The computer according to claim 4, wherein the at least any one of the base software application and the operation software application, when executed by the computer, is further configured to enable the CPU of the computer to charge the fee in accordance with at least any one of an information throughput when processing the first machine information by the base software application and an information throughput when processing the second machine information by the operation software application.

13. The computer according to claim 4, wherein the at least any one of the base software application and the operation software application, when executed by the computer, is further configured to enable the CPU of the computer to charge the fee in accordance with the number of people who have used the computer.

14. The computer according to claim 4, wherein the at least any one of the base software application and the operation software application, when executed by the computer, is further configured to enable the CPU of the computer to determine a duration of use of at least any one of the base software application and the operation software application in accordance with a payment status of a usage fee predetermined for at least any one of the base software application and the operation software application.

15. The computer according to claim 4, wherein the at least any one of the base software application and the operation software application, when executed by the computer, is further configured to disable the CPU of the computer from charging the fee, when a duration of use of at least any one of the base software application and the operation software application from a starting point is within a certain time period.

16. The computer according to claim 4, wherein the at least any one of the base software application and the operation software application, when executed by the computer, is further configured to enable the CPU of the computer to determine whether or not payment of the usage fee of at least any one of the base software application and the operation software application is completed.

17. The computer according to claim 1, wherein the base software application, when executed by the computer, is further configured to enable the CPU of the computer to manage the version number of at least any one of the base software application and the operation software application.

18. The computer according to claim 17, further comprising:
a memory unit for storing the latest version number of at least any one of the base software application and the operation software application, wherein
the base software application, when executed by the computer, is further configured to:
enable the CPU of the computer to check the contents of the memory unit, and
enable the CPU of the computer to output the latest version number, when the latest version number of at least any one of the base software application and the operation software application stored in the memory unit is later than the current version number of at least any one of the base software application and the operation software application.

19. The computer according to claim 17, further comprising:
a memory unit for storing the latest version number of at least any one of the base software application and the operation software application, wherein
the base software application, when executed by the computer, is further configured to:
enable the CPU of the computer to communicate with an external device,
enable the CPU of the computer to check the contents of the memory unit, and
enable the CPU of the computer to output the latest version number to the external device third, when the latest version number of at least any one of the base software application and the operation software application stored in the memory unit is later than the current version number of at least any one of the base software application and the operation software application.

20. The computer according to claim 1, wherein at least any one of the base software application and the operation software application, when executed by the computer, is further configured to enable the CPU of the computer to execute license authentication of at least any one of the base software application and the operation software application.

21. The computer according to claim 1, wherein at least any one of the base software application and the operation software application; when executed by the computer, is further configured to enable the CPU of the computer to execute a copy protection function.

22. The computer according to claim 1, wherein at least any one of the base software application and the operation software application; when executed by the computer, is further configured to enable the CPU of the computer to add advertisement information to information to be outputted outside the computer.

23. The computer according to claim 1, wherein at least any one of the base software application and the operation software application, when executed by the computer, is further configured to enable the CPU of the computer to execute personal assistance.

24. The computer according to claim 1, wherein the base software application, when executed by the computer, is further configured to enable the CPU of the computer to authenticate the machine connected to the computer.

25. The computer according to claim 1, wherein a machine learning software application is installed in the at least one memory in the computer and, when executed by the computer, is configured to enable the CPU of the computer to perform machine learning based on the second machine information.

26. The computer according to claim 1, further comprising:
a host computer connected to the computer through the Internet, wherein
the base software application, when executed by the computer, is further configured to enable the CPU of the computer to upload the first machine information or the second machine information to the host computer in response to a command from the host computer.

27. The computer according to claim 1, further comprising:
a host computer connected to the computer through the Internet, wherein
the base software application, when executed by the computer, is further configured to enable the CPU of the computer to download data or a program from the host computer to the computer in response to a command from the host computer.

28. The computer according to claim 1, wherein a part of the first machine information and the second machine information are information about at least any one of an operating time of the machine, the current value, vibration value, generated temperature, and sound volume of a motor, and position information of the machine.

29. The computer according to claim 1, wherein the machine is a production machine or an industrial robot.

30. A machine control computer communicatably connected to at least two machines, comprising a base software application and an operation software application installed in at least one memory in the computer, wherein
the base software application, when executed by the computer, is configured to:
enable a CPU of the computer to receive first machine information, which are specific to each of the machines, outputted from each of the machines in association with identification information of each of the machines;
enable the CPU of the computer to transmit second machine information specific to the operation software application to the operation software application in association with the identification information of each of the machines; and
enable the CPU of the computer to convert the first machine information into the second machine information, based on a data model corresponding to a category of the machine, wherein
the operation software application, when executed by the computer, is configured to use the second machine information as input information to control the machines,
the data model has a tree-type data structure in which both (1) each individual physical element constituting the machine and (2) various management elements of the machine are indicated by a node, and the first machine information is assigned to the node corresponding to (1) the individual physical element and (2) the various management elements,
each of the machines includes a plurality of physical axes and a plurality of motors each being associated with a corresponding one of the plurality of physical axes, and
the each individual physical element indicated by the node in the tree-type data structure includes a corresponding one of the plurality of physical axes.

31. A machine control computer communicatably connected to a machine, comprising a base software application and an operation software application installed in at least one memory in the computer, wherein
the base software application, when executed by the computer, is configured to:
enable a CPU of the computer to receive first machine information, which is specific to the machine, outputted from the machine, and to transmit second command information specific to the machine to the machine in order to send a command to the machine;
enable the CPU of the computer to receive first command information specific to the operation software application from the operation software application, and to transmit second machine information specific to the operation software application to the operation software application; and
enable the CPU of the computer to convert the first machine information into the second machine information based on a data model corresponding to a category of the machine, and to convert the first command information into the second command information based on the data model, wherein
the operation software application, when executed by the computer, is configured to enable the CPU of the computer to generate the first command information based on the second machine information and output the first command information to control the machine,
the data model has a tree-type data structure in which both (1) each individual physical element constituting the machine and (2) various management elements of the machine are indicated by a node, and the first machine information is assigned to the node corresponding to (1) the individual physical element and (2) the various management elements,
the machine includes a plurality of physical axes and a plurality of motors each being associated with a corresponding one of the plurality of physical axes, and
the each individual physical element indicated by the node in the tree-type data structure includes a corresponding one of the plurality of physical axes.

32. The computer according to claim 31, wherein
the base software application, when executed by the computer, is further configured to enable the CPU of the computer to determine whether the operation software application is appropriate or inappropriate,
the operation software application includes certification record information based on maker information of the operation software application and an examination result of the operation software application,
a part of the first command information is the certification record information, and
in response to determining that the certification record information is inappropriate, the base software application, when executed by the computer, is further configured to disable the CPU of the computer from receiving the first command information specific to the operation software application from the operation software application and transmitting the second machine information specific to the operation software application to the operation software application.

33. The computer according to claim 31, wherein
a part of the first machine information and the second machine information are information about at least one of an operating time of the machine and the current value, vibration value, generated temperature, and sound volume of a motor, and
a part of the first command information and the second command information are information about at least any one of a stop command or a deceleration command for the machine and a warning display.

34. The computer according to claim 31, wherein
a part of the first machine information is position information of the machine, and
when the relative position between a plurality of the machines becomes within a certain distance, a part of the second command information is operation command information for the machines in order to prevent interference between the machines by issuing a stop command to the machine having a lower priority.

35. The computer according to claim 31, wherein
a part of the first machine information is operation reception information and operation completion information on the machine, and
a part of the second command information is operation command information including at least one of a choice of contents, an operation sequence, an actuation of the machine, and a stop of the machine as to an operation stored in advance in the machine.

36. The computer according to claim 31, wherein
a part of the first machine information is information about a state of an object to be operated by the machine, and
a part of the second command information is operation change command information to change the operation of the machine in accordance with the state of the object to be operated.

37. The computer according to claim 31, wherein
a part of the first machine information is scheduled operation information on the machine, and
a part of the second command information is a determination result of whether a scheduled operation of the machine is appropriate or inappropriate.

38. A machine control computer communicatably connected to at least two machines, comprising a base software application and an operation software application installed in at least one memory in the computer, wherein
the base software application, when executed by the computer, is configured to:
enable a CPU of the computer to receive first machine information, which are specific to each of the machines, outputted from each of the machines in association with identification information of each of the machines, and to transmit second command information specific to each of the machines to each of the machines;

enable the CPU of the computer to receive first command information, which is specific to the operation software application, outputted from the operation software application in association with the identification information of each of the machines, and to transmit second machine information specific to the operation software application to the operation software application in association with the identification information of each of the machines; and enable the CPU of the computer to convert the first machine information into the second machine information based on a data model corresponding to a category of the machine, and to convert the first command information into the second command information based on the data model, wherein the machine has the function of outputting a state of the machine to the computer as the first machine information, and the function of determining an operation to be performed by the machine based on the second command information, the operation software application, when executed by the computer, is configured to enable the CPU of the computer to generate the first command information for each of the machines based on the second machine information inputted in association with the identification information of each of the machines, and output the first command information in association with the identification information of each of the machines to control the machine, the data model has a tree-type data structure in which both (1) each individual physical element constituting the machine and (2) various management elements of the machine are indicated by a node, and the first machine information is assigned to the node corresponding to (1) the individual physical element and (2) the various management elements, each of the machines includes a plurality of physical axes and a plurality of motors each being associated with a corresponding one of the plurality of physical axes, and the each individual physical element indicated by the node in the tree-type data structure includes a corresponding one of the plurality of physical axes.

39. A machine control computer communicatably connected to a machine, comprising a base software application and an operation software application installed in at least one memory in the computer, wherein the base software application, when executed by the computer, is configured to:

enable a CPU of the computer to receive first machine information, which is specific to the machine, outputted from the machine;

enable the CPU of the computer to transmit second machine information specific to the operation software application to the operation software application; and enable the CPU of the computer to convert the first machine information into the second machine information, based on a data model corresponding to a category of the machine, wherein the operation software application, when executed by the computer, is configured to use the second machine information as input information to control the machine, the data model has a data structure in which at least each individual physical element constituting the machine or various management elements of the machine is or are indicated by a node, and the first machine information is assigned to the node corresponding to the individual physical element or the various management elements, the base software application, when executed by the computer, is further configured to enable the CPU of the computer to determine whether the operation software application is appropriate or inappropriate, and in response to determining that the operation software application is inappropriate, the base software application, when executed by the computer, is further configured to disable the CPU of the computer from transmitting the second machine information specific to the operation software application to the operation software application.

40. A machine system comprising a machine, a machine control computer communicatably connected to the machine, and a base software application and an operation software application installed in at least one memory in the computer, wherein the base software application, when executed by the computer, is configured to:

enable a CPU of the computer to receive first machine information, which is specific to the machine, outputted from the machine;

enable the CPU of the computer to transmit second machine information specific to the operation software application to the operation software application; and enable the CPU of the computer to convert the first machine information into the second machine information, based on a data model corresponding to a category of the machine, wherein the machine has the function of outputting a state of the machine to the computer as the first machine information, the operation software application, when executed by the computer, is configured to use the second machine information as input information to control the machine, the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

41. A machine system comprising at least two machines, a machine control computer communicatably connected to the machines, and a base software application and an operation software application installed in at least one memory in the computer, wherein the base software application, when executed by the computer, is configured to:

enable a CPU of the computer to receive first machine information, which are specific to each of the machines, outputted from each of the machines in association with identification information of each of the machines;

enable the CPU of the computer to transmit second machine information specific to the operation software application to the operation software application in association with the identification information of each of the machines; and enable the CPU of the computer to convert the first machine information into the second machine information, based on a data model corresponding to a category of the machine, wherein the machine has the function of outputting a state of the machine to the computer as the first machine information in association with the identification information of each of the machines, the operation software application, when executed by the computer, is configured to use the second machine information as input information to control the machines, the data model has a tree-type data structure in which both (1) each individual physical element constituting the machine and (2) various management elements of the machine are indicated by a node, and the first machine information is assigned to the node corresponding to (1) the individual physical element and (2) the various management elements, each of the machines includes a plurality of physical axes and a plurality of motors each being associated with a corresponding one of the plurality of physical axes, and the each individual physical element indicated by the node in the tree-type data structure includes a corresponding one of the plurality of physical axes.

42. A machine system comprising a machine, a machine control computer communicatably connected to the machine, and a base software application and an operation software application installed in at least one memory in the computer, wherein the base software application, when executed by the computer, is configured to:

enable a CPU of the computer to receive first machine information, which is specific to the machine, outputted from the machine, and to transmit second command information specific to the machine to the machine;

enable the CPU of the computer to receive first command information specific to the operation software application from the operation software application, and to transmit second machine information specific to the operation software application to the operation software application; and enable the CPU of the computer to convert the first machine information into the second machine information based on a data model corresponding to a category of the machine, and to convert the first command information into the second command information based on the data model, wherein the machine has the function of outputting a state of the machine to the computer as the first machine information, and the function of determining an operation to be performed by the machine based on the second command information, the operation software application, when executed by the computer, is configured to enable the CPU of the computer to generate the first command information based on the second machine information and output the first command information to control the machine, the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

43. A machine system comprising at least two machines, a machine control computer communicatably connected to the machines, and a base software application and an operation software application installed in at least one memory in the computer, wherein the base software application, when executed by the computer, is configured to:

enable a CPU of the computer to receive first machine information, which are specific to each of the machines, outputted from each of the machines in association with identification information of each of the machines, and to transmit second command information specific to each of the machines to each of the machines;

enable the CPU of the computer to receive first command information, which is specific to the operation software application, outputted from the operation software application in association with the identification information of each of the machines, and to transmit second machine information specific to the operation software application to the operation software application in association with the identification information of each of the machines; and enable the CPU of the computer to convert the first machine information into the second machine information based on a data model corresponding to a category of the machine, and to convert the first command information into the second command information based on the data model, wherein the machine has the function of outputting a state of the machine to the computer as the first machine information, and the function of determining an operation to be performed by the machine based on the second command information, the operation software application, when executed by the computer, is configured to enable the CPU of the computer to generate the first command information for each of the machines based on the second machine information inputted in association with the identification information of each of the machines, and output the first command information in association with the identification information of each of the machines to control the machine, the data model has a tree-type data structure in which both (1) each individual physical element constituting the machine and (2) various management elements of the machine are indicated by a node, and the first machine information is assigned to the node corresponding to (1) the individual physical element and (2) the various management elements, each of the machines includes a plurality of physical axes and a plurality of motors each being associated with a corresponding one of the plurality of physical axes, and the each individual physical element indicated by the node in the tree-type data structure includes a corresponding one of the plurality of physical axes.

44. A non-transitory computer-readable recording medium storing a base software application installed in a machine control computer communicatably connected to a machine, together with an operation software application, the base software application, when executed by the computer, is configured to enable a CPU of the computer to execute the steps of:

receiving first machine information, which is specific to the machine, outputted from the machine to the computer;

converting the first machine information into second machine information specific to the operation software application, based on a data model corresponding to a category of the machine; and outputting the second machine information to the operation software application, wherein the operation software application, when executed by the computer, is configured to use the second machine information as input information to control the machine, the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

45. A non-transitory computer-readable recording medium storing a base software application installed in a machine control computer communicatably connected to at least two machines, together with an operation software application, the base software application, when executed by the computer, is configured to enable a CPU of the computer to execute the steps of:

receiving first machine information, which are specific to each of the machines, outputted from each of the machines to the computer in association with identification information of each of the machines;

converting the first machine information into second machine information specific to the operation software application, based on a data model corresponding to a category of the machine; and outputting the second machine information to the operation software application in association with the identification information of each of the machines, wherein the operation software application, when executed by the computer, is configured to use the second machine information as input information to control the machines, the data model has a tree-type data structure in which both (1) each individual physical element constituting the machine and (2) various management elements of the machine are indicated by a node, and the first machine information is assigned to the node corresponding to (1) the individual physical element and (2) the various management elements, each of the machines includes a plurality of physical axes and a plurality of motors each being associated with a corresponding one of the plurality of physical axes, and the each individual physical element indicated by the node in the tree-type data structure includes a corresponding one of the plurality of physical axes.

46. A non-transitory computer-readable recording medium storing a base software application installed in a machine control computer communicatably connected to a machine, together with an operation software application, the base software application, when executed by the computer, is configured to enable a CPU of the computer to execute the steps of:

receiving first machine information, which is specific to the machine, outputted from the machine to the computer;

converting the first machine information into second machine information specific to the operation software application, based on a data model corresponding to a category of the machine;

outputting the second machine information to the operation software application;

receiving first command information specific to the operation software application from the operation software application;

converting the first command information into second command information specific to the machine, based on the data model; and transmitting the second command information to the machine to control the machine, wherein the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

47. A non-transitory computer-readable recording medium storing a base software application installed in a machine control computer communicatably connected to at least two machines, together with an operation software application, the base software application, when executed by the computer, is configured to enable a CPU of the computer to execute the steps of:

receiving first machine information, which are specific to each of the machines, outputted from each of the machines to the computer in association with identification information of each of the machines;

converting the first machine information into second machine information specific to the operation software application, based on a data model corresponding to a category of the machine;

outputting the second machine information to the operation software application in association with the identification information of each of the machines, receiving first command information, which is specific to the operation software application, outputted from the operation software application in association with the identification information of each of the machines;

converting the first command information into second command information specific to the machine, based on the data model; and transmitting the second command information to each of the machines corresponding to the second command information to control the machine, wherein the data model has a tree-type data structure in which both (1) each individual physical element constituting the machine and (2) various management elements of the machine are indicated by a node, and the first machine information is assigned to the node corresponding to (1) the individual physical element and (2) the various management elements, each of the machines includes a plurality of physical axes and a plurality of motors each being associated with a corresponding one of the plurality of physical axes, and the each individual physical element indicated by the node in the tree-type data structure includes a corresponding one of the plurality of physical axes.

48. A machine control method for controlling at least one machine by a machine control computer having a base software application and an operation software application installed in at least one memory in the computer, the machine control method comprising the steps of:

by the computer, receiving machine-specific first machine information indicating a state of the machine and outputted from the machine, converting the first machine information into operation software application-specific second machine information by the base software application based on a data model corresponding to a category of the machine, and outputting the second machine information to the operation software application; and by the computer, executing the operation software application that uses the second machine information as input information to control the machine, wherein the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

49. A machine control method for controlling at least one machine by a machine control computer having a base software application and an operation software application installed in at least one memory in the computer, the machine control method comprising the steps of:

by the computer, receiving machine-specific first machine information indicating a state of the machine and outputted from the machine, converting the first machine information into operation software application-specific second machine information by the base software application based on a data model corresponding to a category of the machine, and outputting the second machine information to the operation software application; and by the computer, generating operation software application-specific first command information by the operation software application based on the second machine information, converting the first command information into machine-specific second command information by the base software application based on the data model, and transmitting the second command information to the machine to control the machine, wherein the data model has a tree-type data structure in which both (1) each individual physical element constituting the machine and (2) various management elements of the machine are indicated by a node, and the first machine information is assigned to the node corresponding to (1) the individual physical element and (2) the various management elements, the machine includes a plurality of physical axes and a plurality of motors each being associated with a corresponding one of the plurality of physical axes, and the each individual physical element indicated by the node in the tree-type data structure includes a corresponding one of the plurality of physical axes.

* * * * *